(12) United States Patent
Koreishi

(10) Patent No.: US 10,373,496 B2
(45) Date of Patent: Aug. 6, 2019

(54) PARKING MANAGEMENT SYSTEM AND PARKING MANAGEMENT METHOD

(71) Applicant: TOYOTA JIDOSHA KABUSHIKI KAISHA, Toyota-shi, Aichi-ken (JP)

(72) Inventor: Jun Koreishi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/870,918

(22) Filed: Jan. 13, 2018

(65) Prior Publication Data
US 2018/0276992 A1 Sep. 27, 2018

(30) Foreign Application Priority Data

Mar. 23, 2017 (JP) .................................. 2017-058224
May 31, 2017 (JP) .................................. 2017-107288

(51) Int. Cl.
*G08G 1/14* (2006.01)
*G06K 9/00* (2006.01)
*G06K 9/18* (2006.01)
*H04W 4/38* (2018.01)
*G08G 1/16* (2006.01)

(52) U.S. Cl.
CPC ......... *G08G 1/148* (2013.01); *G06K 9/00771* (2013.01); *G06K 9/18* (2013.01); *G08G 1/144* (2013.01); *G08G 1/168* (2013.01); *H04W 4/38* (2018.02)

(58) Field of Classification Search
CPC ........... G06Q 30/0201; G06Q 30/0284; G06Q 20/102; G06Q 20/18; G07B 15/02; G07F 17/24; G08G 1/14; G08G 1/147
See application file for complete search history.

(56) References Cited

U.S. PATENT DOCUMENTS 5,287,414 A * 2/1994 Foster ................ G06K 7/10079
235/383
8,004,426 B2 * 8/2011 Dasgupta ................. G08G 1/14
340/932.2

(Continued)

FOREIGN PATENT DOCUMENTS

JP 2004199177 A 7/2004
JP 2008234456 A 10/2008

(Continued)

*Primary Examiner* — Hoi C Lau
(74) *Attorney, Agent, or Firm* — Hunton Andrews Kurth LLP

(57) ABSTRACT

A technique for managing parking of vehicles at a lower cost is disclosed. A parking management system includes a terminal device and a server device. The terminal device includes: a storage unit that stores user information; a reading unit that reads identification information of a parking space from a code associated with the parking space, and a transmission unit that transmits, to the server device, parking position information which includes the stored user information and the read identification information. The server device includes: a receiving unit that receives the parking position information from the terminal device; and an identifying unit that identifies a position where a vehicle is parked and a user of the parked vehicle, based on the received parking position information.

8 Claims, 16 Drawing Sheets

(56) References Cited

U.S. PATENT DOCUMENTS

| | | | | |
|---|---|---|---|---|
| 8,325,063 B2* | 12/2012 | Dasgupta | ................ | G08G 1/14 340/932.2 |
| 10,165,050 B2* | 12/2018 | Iasi | ................ | H04L 67/06 |
| 2005/0029358 A1* | 2/2005 | Mankins | ................ | G06Q 20/18 235/462.46 |
| 2010/0085214 A1 | 4/2010 | Kim | | |
| 2010/0090865 A1* | 4/2010 | Dasgupta | ................ | G08G 1/14 340/932.2 |
| 2011/0057815 A1* | 3/2011 | King | ................ | G07B 15/02 340/932.2 |
| 2011/0238464 A1* | 9/2011 | Dasgupta | ................ | G08G 1/14 705/13 |
| 2012/0130775 A1* | 5/2012 | Bogaard | ................ | G06Q 30/0284 705/13 |
| 2012/0130891 A1* | 5/2012 | Bogaard | ................ | G06Q 20/102 705/40 |
| 2012/0218122 A1* | 8/2012 | Bogaard | ................ | G07B 15/02 340/870.03 |
| 2012/0234906 A1* | 9/2012 | Ganapathi | ................ | G07F 17/24 235/375 |
| 2015/0142309 A1* | 5/2015 | Sun | ................ | B60W 10/00 701/469 |
| 2015/0142533 A1* | 5/2015 | Shalev | ................ | G06Q 50/30 705/13 |
| 2015/0170164 A1* | 6/2015 | Marsico | ................ | G06Q 30/0201 235/375 |
| 2015/0271164 A1* | 9/2015 | Hamid | ................ | H04L 63/0853 726/7 |
| 2015/0294567 A1* | 10/2015 | De La Plaza Ortega | ................ | G08G 1/144 340/932.2 |
| 2016/0163197 A1* | 6/2016 | Levy | ................ | G08G 1/147 340/932.2 |
| 2016/0232500 A1* | 8/2016 | Wang | ................ | G06Q 30/0284 |
| 2018/0114004 A1* | 4/2018 | Hamid | ................ | G06F 3/04886 |
| 2018/0276992 A1* | 9/2018 | Koreishi | ................ | H04W 4/38 |

FOREIGN PATENT DOCUMENTS

| | | |
|---|---|---|
| JP | 2010-146229 A | 7/2010 |
| JP | 2014-222477 A | 11/2014 |

* cited by examiner

PARKING MANAGEMENT SYSTEM AND PARKING MANAGEMENT METHOD

CROSS-REFERENCES TO RELATED APPLICATIONS

This application relates to and claims priority from Japanese Patent Applications No. 2017-107288, filed on May 31, 2017, and No. 2017-058224, filed on Mar. 23, 2017, the entire disclosure of which is incorporated herein by reference.

BACKGROUND

Field

The present invention relates to a parking management system and a parking management method.

Description of Related Art

A computer system that manages the parking of vehicles in a parking lot is known. JP2014-222477 A discloses a parking management system that recognizes the license plate number of each vehicle that enters and exits a parking lot using a camera located in the parking lot and manages the information on such vehicles in association with the recognized numbers.

SUMMARY

This type of conventional parking management system needs to install a camera or the like in the parking lot to recognize the vehicles parked in the parking lot. In other words, the conventional system requires a cost to install such equipment in order to perform parking management.

The present invention has been made in view of the above circumstances, and an object of the present invention is to provide a technique to enable the parking of vehicles to be managed at a lower cost.

A parking management system according to the present invention includes a terminal device and a server device. The terminal device includes: a storage unit that stores user information; a reading unit that reads identification information of a parking space from a code associated with the parking space, and a transmission unit that transmits, to the server device, parking position information which includes the stored user information and the read identification information. The server device includes: a receiving unit that receives the parking position information from the terminal device; and an identifying unit that identifies a position where a vehicle is parked and a user of the parked vehicle, based on the received parking position information.

A parking management method according to the present invention is a method implemented in a parking management system including a terminal device and a server device. The method includes performing, in the terminal device, the steps of: storing user information; reading identification information of a parking space from a code associated with the parking space; and transmitting, to the server device, parking position information which includes the stored user information and the read identification information. The method also includes performing, in the server device, the steps of: receiving the parking position information from the terminal device; and identifying a position where a vehicle is parked and a user of the parked vehicle, based on the received parking position information.

The present invention provides a technique to manage the parking of vehicles at a lower cost.

DETAILED DESCRIPTION

Hereinafter, embodiments of the present invention will be specifically described with reference to the attached drawings. The scope of the invention, however, will not be limited to such embodiments.

1. HARDWARE CONFIGURATION

Figure 1:
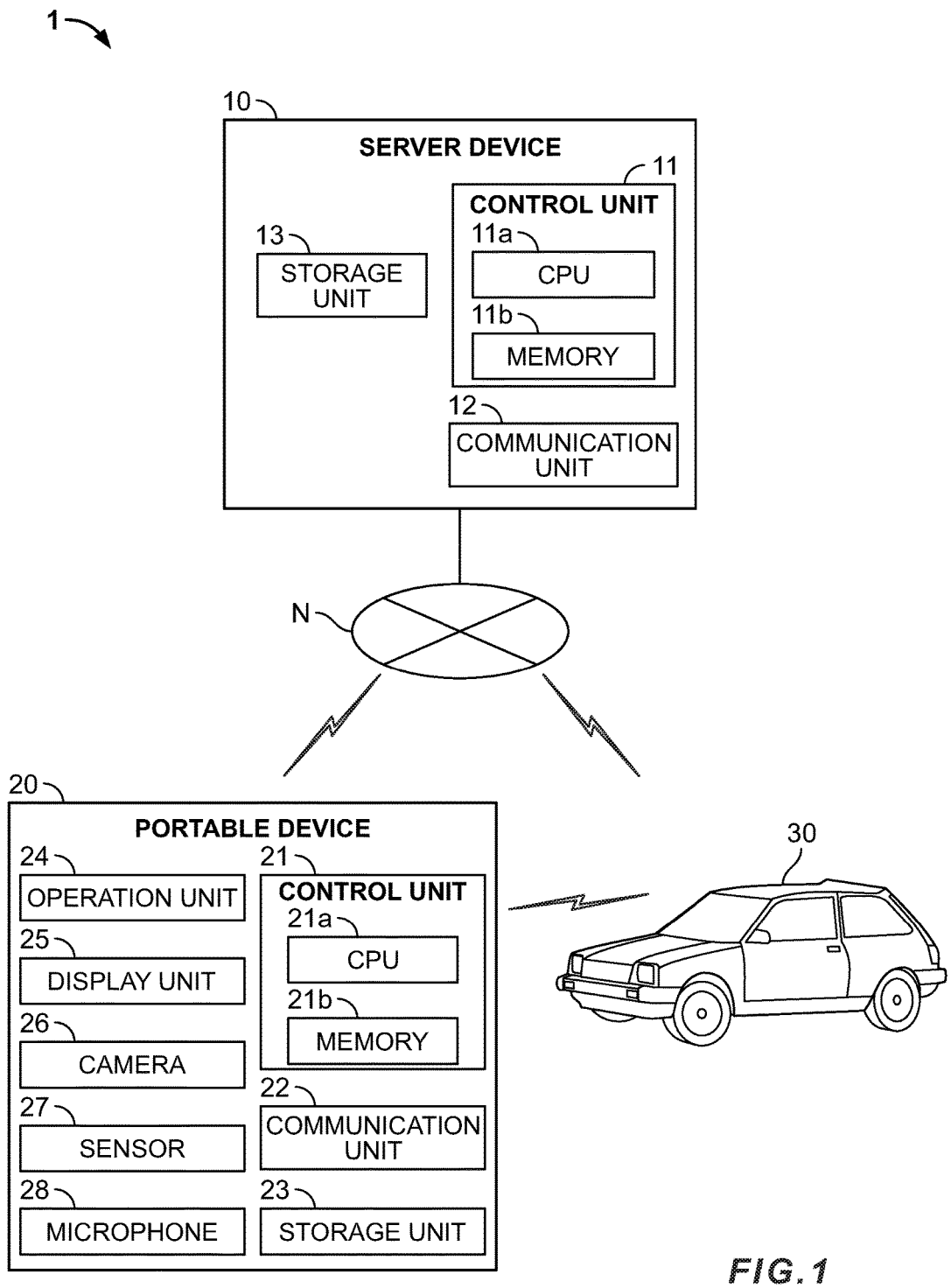
FIG. 1 is an illustration showing an example of the schematic configuration of a parking management system according to an embodiment.

An example of the hardware configuration of a parking management system according to an embodiment will now be described, referring to FIG. 1. A parking management system 1 is a computer system for managing the parking (entry and exit) of vehicles in a parking lot. The parking management system 1 includes, as major components thereof, a server device 10, a portable device 20, and a vehicle 30. The portable device 20 and the vehicle 30 are each able to communicate with the server device 10 via a network N. The portable device 20 and the vehicle 30 are able to communicate with each other (via, for example, Bluetooth® or Wi-Fi®). The parking management system 1 can provide, for the user of the portable device 20 who is driving the vehicle 30 and also for a person who owns a parking lot, various services for managing the parking of the vehicle 30 at the parking lot. It should be noted here that, although FIG. 1 shows that the parking management system 1 includes a single portable device 20 and a single vehicle 30, the parking management system 1 may include two or more portable devices 20 and two or more vehicles 30.

The network N is a communication line with which the server device 10 sends and receives information to and from the portable device 20 and the vehicle 30. The network N may be a given type of communication line, examples of which may include the Internet, packet communication networks, telephone lines, other communication lines, and combinations thereof, and the network N may be a wired or wireless communication line (or a combination thereof).

The server device 10 is comprised of an information processor, such as a general or special purpose server computer. The server device 10 may be comprised of a single information processor or a plurality of information processors distributed on the network.

The server device 10 mainly includes a control unit 11, a communication unit 12 and a storage unit 13. The control unit 11 is configured so as to mainly include a CPU (Central Processing Unit) 11a and memory 11b. Each of the components will be described later. For example, the CPU 11a may execute a predetermined program stored in the memory 11b, etc., whereby the server device 10 serves as means for implementing various functions. It should be noted that FIG. 1 only illustrates the major components of the server device 10, and the server device 10 may also include other components generally provided in information processors.

The control unit 11 controls the operation of each component of the server device 10, and also controls the execution of various types of processing. Examples of the processing performed in the control unit 11 will be described later in detail. The communication unit 12 is a communication interface for communication with external devices. The storage unit 13 is comprised of storage devices, such as hard disks. The storage unit 13 stores various programs and information necessary for the execution of various types of processing in the server device 10.

The portable device 20 is a mobile information processor (mobile terminal), examples of which include mobile phones (including smartphones), tablets, PDAs (Personal Digital Assistants), navigation devices, and personal computers. The portable device 20 is configured so as to mainly include a control unit 21, a communication unit 22, a storage unit 23, an operation unit 24, a display unit 25, a camera 25, a sensor 27 and a microphone 28. The control unit 21 is configured so as to mainly include a CPU 21a and memory 21b. For example, the CPU 21a may execute a predetermined program stored in the memory 21b, etc., whereby the portable device 20 serves as means for implementing various functions.

The control unit 21 controls the operation of each component of the portable device 20, and also controls the execution of various types of processing. Examples of the processing performed in the control unit 21 will be described later in detail. The communication unit 22 is a communication interface for communication with external devices. The storage unit 23 is comprised of storage devices, such as semiconductor storage units. The storage unit 23 stores various programs and information necessary for the execution of various types of processing in the portable device 20. The operation unit 24 is a user interface for receiving user's operations and instructions. The display unit 25 is a user interface for presenting the results of processing performed by the portable device 20. The camera 26 is a device capable of capturing still images or moving images.

The sensor 27 is comprised of various types of sensors. The sensor 27 may include, for example, a gyroscope sensor, an acceleration sensor, a magnetic field sensor, an audio sensor, and/or an image sensor. The microphone 28 is a device that converts the voice/sound generated by the user who is holding the portable device 20 into an electric signal so as to thereby obtain sound information.

The vehicle 30 is a given type of vehicle that can be parked in a parking lot. The vehicle 30 is driven by the user of the portable device 20. The vehicle 30 has a similar hardware configuration to that shown in FIG. 1 as the hardware configuration of the portable device 20, which includes the control unit 21, the communication unit 22, the storage unit 23, the operation unit 24, the display unit 25, the camera 26 and the sensor 27. The configuration of the vehicle 30 including such components can be specified as an in-vehicle terminal. The vehicle 30 further includes other components generally provided in vehicles.

As described above, the parking management system 1 of the present embodiment includes the server device 10, the portable device 20, and the vehicle 30, but the devices included in the system are not limited thereto, and the system may include other given types of devices. The parking management system 1 can also be understood as being a system composed of some of the components provided in the server device 10, the portable device 20 and the vehicle 30.

2. FUNCTIONAL CONFIGURATION

Figure 2:
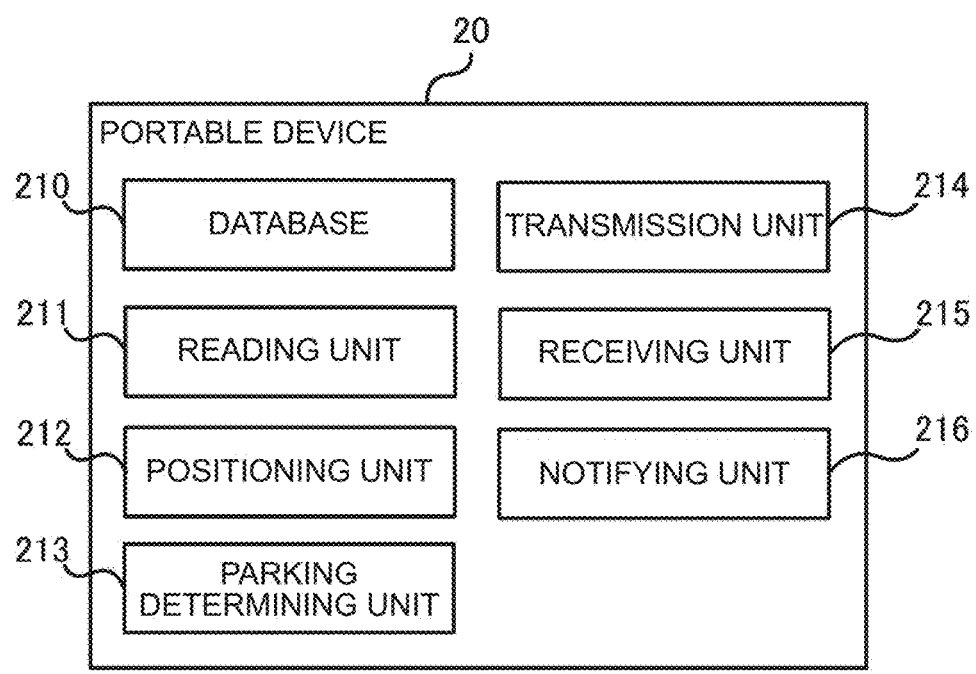
FIG. 2 is an illustration showing an example of the functional configuration of a portable device according to an embodiment.

An example of the functional configuration of each of the devices provided in a parking management system according to an embodiment will now be described. First, the functional configuration of the portable device 20 will be described with reference to FIG. 2. The portable device 20 includes, as major functional components thereof, a database 210, a reading unit 211, a positioning unit 212, a parking determining unit 213, a transmission unit 214, a receiving unit 215, and a notifying unit 216. For example, the CPU 21a may execute a predetermined program stored in the memory 21b, etc., and cooperate with the hardware units of the portable device 20, whereby the portable device 20 implements the functional components shown in FIG. 2. Each of the functional components will now be described in detail.

The database 210 stores various types of information, such as information necessary for the processing performed in the portable device 20 and information generated through such processing. The database 210 stores, for example, user information, such as a user ID, of the portable device 20, as well as data for application programs installed in the portable device 20.

The reading unit 211 is able to read positional information associated with each parking space (or identification information for each parking space) from the code detected using the camera 26, etc. For example, a 2D barcode, such as a Chameleon Code or a QR Code®, is attached to each parking space in the parking lot, and when the user operates the portable device 20 to take an image of the 2D barcode with the camera 26, the reading unit 211 can read (obtain) the identification information of the parking space from the image of the code obtained through the camera 26. The code attached to each parking space contains the coded positional information on the parking space (or the identification information for the parking space). In this manner, the reading unit 211 is able to read the positional information or the identification information on each parking space from a code associated with the parking space.

Figure 3:
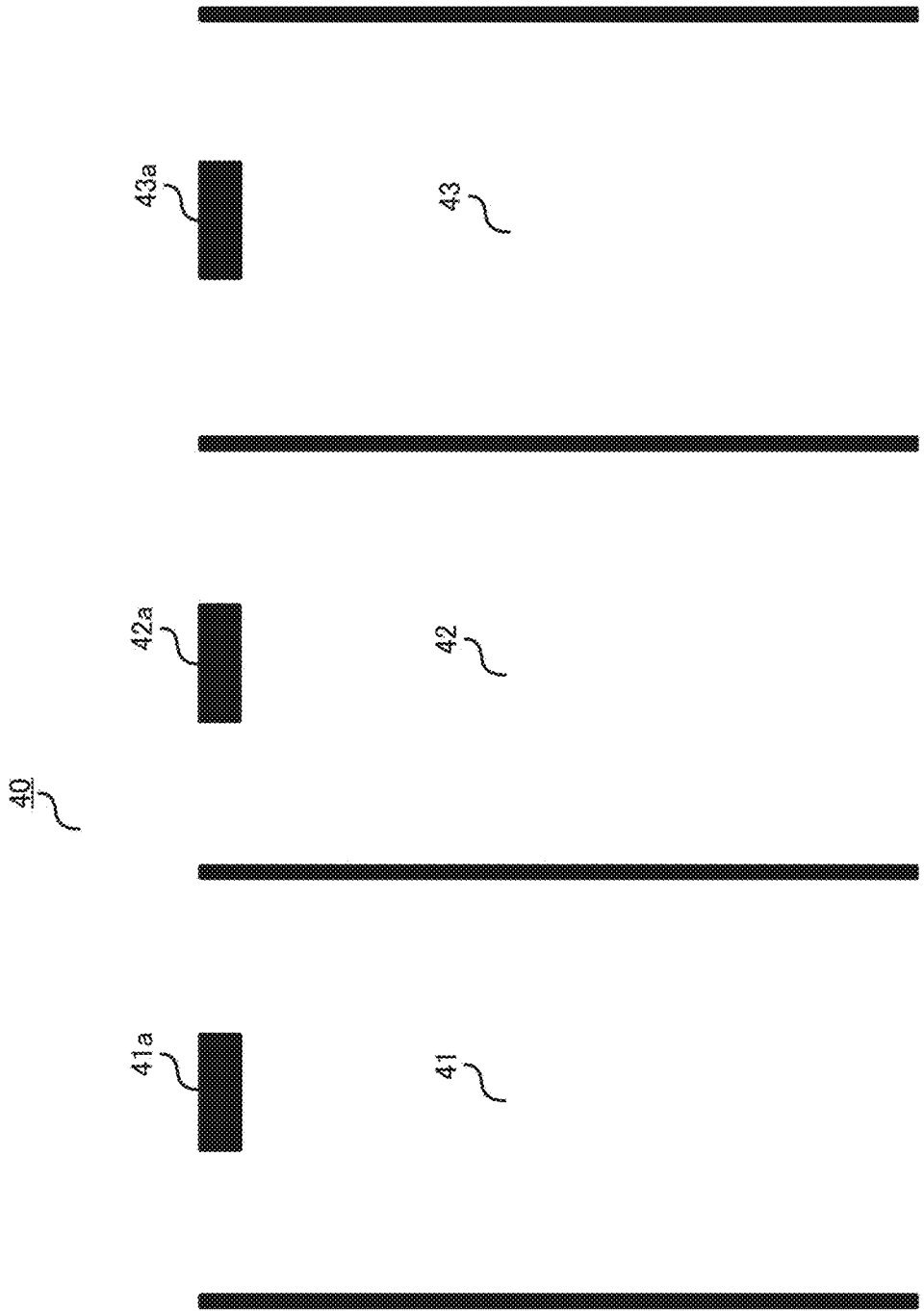
FIG. 3 is an illustration showing an example of a parking space according to an embodiment.

An example of the code attached to the parking space will next be described, referring to FIG. 3. FIG. 3 illustrates a parking lot 40 that includes parking spaces 41, 42 and 43 which are respectively associated with 2D barcodes 41a, 42a and 43a attached thereto. The 2D barcodes 41a, 42a and 43a each have encoded information identifying the corresponding one of the parking spaces 41, 42 and 43 (e.g., the encoded positional information of the corresponding parking space). For example, when the user of the portable device 20 parks the vehicle 30 at the parking space 41 and then takes an image of the 2D barcode 41a with the camera 26 of the portable device 20, the reading unit 211 can obtain information on the parking space 41 (e.g., the positional information of the parking space 41) from the image of the 2D barcode 41a.

Although the 2D barcodes 41a, 42a and 43a are attached to the associated parking spaces in the example shown in FIG. 3, the manner in which the 2D barcodes are provided is not limited thereto. For example, the 2D barcodes 41a, 42a and 43a may be attached to a supporting member, such as a pylon or a pole, located in each parking space. Furthermore, the code attached to the associated parking space is not limited a 2D barcode, and may be a given type of code, including a linear barcode and a 3D barcode.

Referring back to FIG. 2, the positioning unit 212 performs processing for identifying the position (e.g., the latitude and longitude) of the portable device 20 based on signals that the portable device 20 has received from GPS (Global Positioning System) satellites and communication apparatuses (e.g., base stations), as well as for identifying the date and time when such position is identified (in other words, the positioning unit 212 performs processing to identify the positioning information).

The parking determining unit 213 can determine the start and end of the parking of the vehicle 30 in the parking lot 40 based on the position of the portable device 20 as identified by the positioning unit 212 and the results of sensing by the sensor 27 (which indicate the state of the portable device 20 or the state of the user of the portable device 20). For example, when the position of the portable device 20 identified by the positioning unit 212 is located in the parking lot 40 and when the sensing by the sensor 27 indicates that the portable device 20 has shifted from an in-vehicle state (i.e., the portable device is moving with the vehicle) to a state other than the in-vehicle state, then the parking determining unit 213 can determine that the parking of the vehicle 30 has started. When the position of the portable device 20 identified by the positioning unit 212 is located in the parking lot 40 and when the sensing by the sensor 27 indicates that the portable device 20 has shifted to an in-vehicle state (i.e., the portable device is moving with the vehicle) from a state other than the in-vehicle state, then the parking determining unit 213 can determine that the parking of the vehicle 30 has ended. Further, based on the timing when the above determination is made, the parking determining unit 213 can determine the time (date and time) when the parking of the vehicle 30 has started and the time (date and time) when the parking of the vehicle 30 has ended.

The parking determining unit 213 can judge which state the user of the portable device 20 is in (such state including, for example, stationary, in-vehicle (moving with the vehicle), walking (moving on foot) and others (e.g., moving by train)) based on the results of sensing by the sensor 27. By determining the start and/or the end of the parking of the vehicle 30 with the aid of the results of such judgment, the parking determining unit 213 can determine the parking of vehicles in a more accurate manner.

For example, when the position of the portable device 20 identified by the positioning unit 212 is located in the parking lot 40 and when the state of the user of the portable device 20 has shifted from in-vehicle (driving in the vehicle) to walking or stationary, the parking determining unit 213 can determine that the parking of the vehicle 30 has started. Furthermore, when the position of the portable device 20 identified by the positioning unit 212 is located in the parking lot 40 and when the state of the user of the portable device 20 has shifted from walking to driving, the parking determining unit 213 can determine that the parking of the vehicle 30 has ended.

Here, any method can be used when judging which state (stationary, in-vehicle (moving with the vehicle), waking (moving on foot), or others (e.g., moving by train)) the user of the portable device 20 is in by referring to the results of sensing by the sensor 27. For example, the feature quantity of each of the user states (i.e., stationary, in-vehicle, walking and driving) is calculated in advance based on the results of sensing by the acceleration sensor and magnetic field sensor provided in the portable device, so that each user state is associated with a particular feature quantity by way of machine learning. Then, the parking determining unit 213 can judge the state of the user of the portable device 20 by referring to the information of such association and the results of sensing by the sensor 27.

The transmission unit 214 transmits, to external devices, information on the results of processing by the portable device 20 and information stored in the portable device 20. For example, the transmission unit 214 is able to transmit, to the server device 10, parking position information which includes: the user information of the portable device 20 stored in the database 210; and the identification information of the parking space read by the reading unit 211 (i.e., the identification information of the parking space read from a code image obtained with the camera 26). The transmission unit 214 is also able to transmit, to the server device 10, information indicating the start or end of the parking (parking start information or parking end information) when the parking determining unit 213 determines that the parking of the vehicle 30 has started or ended. The parking start information may include the start time of the parking and the parking end information may include the end time of the parking.

The receiving unit 215 receives various types of information from external devices of the portable device 20. For example, the receiving unit 215 is able to receive, from the server device 10, various information related to parking, e.g., information on the time during which the user of the portable device 20 parked the vehicle 30 in the parking lot 40, as well as information on the relevant parking fee.

The notifying unit 216 provides various types of notifications to the user of the portable device 20. For example, the notifying unit 216 may provide a notification to the user if no identification information associated with a parking space is read by the reading unit 211 even when a predetermined time (e.g., 10 minutes) has passed after the parking determining unit 213 determines that the parking of the vehicle 30 has started.

A notification by the notifying unit 216 may be made by a given method. For example, a notification may be provided by displaying the content thereof on the display unit 25, by using a speaker system (not shown in the drawing) provided in the portable device 20, or by vibrating the portable device 20. A combination of all or part of the above notification methods may be used to provide a notification.

As described above, according to the present embodiment, the portable device 20 can read, through the reading unit 211, the identification information on each parking space, and can also transmit, to the server device 10 through the transmission unit 214, parking position information which includes the user information of the portable device 20, which is stored in the database 210, and the read identification information on the parking space. As a result, the necessary information for managing the parking of a vehicle can be transmitted to the server device 10, without the need to install, in the parking lot 40, any device, such as a camera, for detecting the parked vehicle. In other words, the present embodiment can manage the parking of vehicles at a lower cost.

Figure 4:
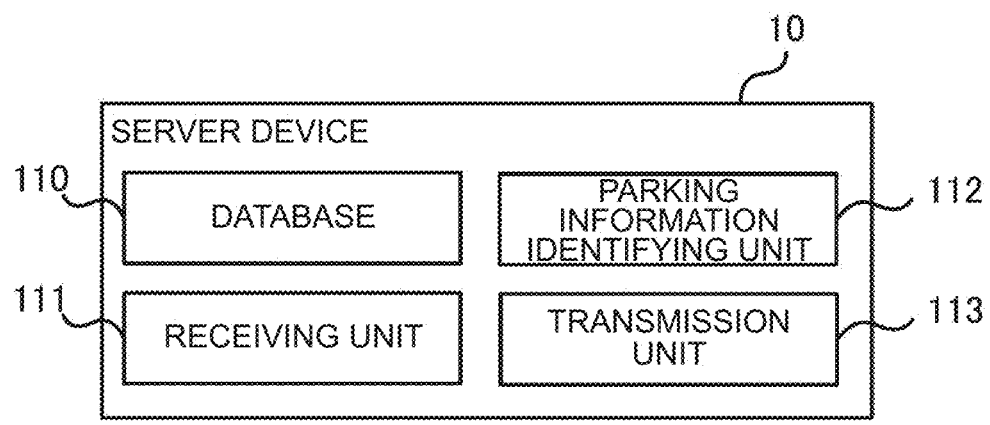
FIG. 4 is an illustration showing an example of the functional configuration of a server device according to an embodiment.

The functional configuration of the server device 10 will now be described, referring to FIG. 4. The server device 10 includes, as the major functional components thereof, a database 110, a receiving unit 111, a parking information identifying unit 112, and a transmission unit 113. For example, the CPU 11a may execute a predetermined program stored in the memory 11b, etc., and cooperate with the hardware units of the server device 10, whereby the server device 10 implements the functional components shown in FIG. 4. Each of the functional components will now be described in detail.

The database 110 stores various types of information, such as information necessary for the processing performed in the server device 10, information generated through such processing, and information received from external devices. The database 110 stores, for example, information on the registered users, information on the registered parking lots, information on the parking reservations made by the users, information on the parking fees, and information on the usage of the parking lots.

The receiving unit 111 receives, from external devices of the server device 10, various types of information as well as instructions to execute various types of processing. For example, the receiving unit 111 receives parking position information, parking start information and parking end information which are sent from the transmission unit 214 of the portable device 20.

The parking information identifying unit 112 identifies the parking information for the vehicle 30 and for other vehicles based on the information received at the receiving unit 111. For example, based on the parking position information, which is sent from the portable device 20 and received at the receiving unit 111, the parking information identifying unit 112 can identify the user of the portable device 20 and the parking position (i.e., the parking space) where the vehicle 30 is parked. The identified parking information for each vehicle is stored in the database 110 in association with the information on the user of the vehicle.

The parking information identifying unit 112 can also identify the parking duration of the vehicle 30 based on the parking start information and parking end information, which are sent from the portable device 20 and received at the receiving unit 111. Further, the parking information identifying unit 112 can calculate the parking fee for the vehicle 30 based on the parking duration of the vehicle 30 as well as information on the parking fee rate. Such information on the parking fee rate may be obtained from, for example, the database 110.

The transmission unit 113 transmits, to external devices, information about the results of processing performed by the server device 10 and information stored in the server device 10. For example, the transmission unit 113 transmits the parking information for the vehicle 30, which is identified by the parking information identifying unit 112, to the portable device 20.

As described above, according to the present embodiment, the portable device 20 can read, through the reading unit 211, the identification information on each parking space and can also transmit, to the server device 10 through the transmission unit 214, parking position information which includes the user information of the portable device 20, which is stored in the database 210, and the read identification information on the parking space. Meanwhile, the server device 10 can identify the parking information for the vehicle 30 and other vehicles based on the information received at the receiving unit 111 from the portable device 20. As a result, the parking management system 1 can perform parking management without the need to install, in a parking lot, any device, such as a camera, for detecting parked vehicles. In other words, the present embodiment can manage the parking of vehicles at a lower cost.

3. IMPLEMENTATION EXAMPLES

Now, the details of processing performed according to specific examples of implementation of the parking management system 1 will be described. In the below descriptions, the processes already described above will be omitted, or only the outline thereof will be mentioned.

3.1 Implementation Example 1

Implementation Example 1 is an example in which parking management is carried out by way of processing performed by the server device 10 and the portable device 20, from among the components of the parking management system 1 shown in FIG. 1.

Implementation Example 1.1

Figure 5:
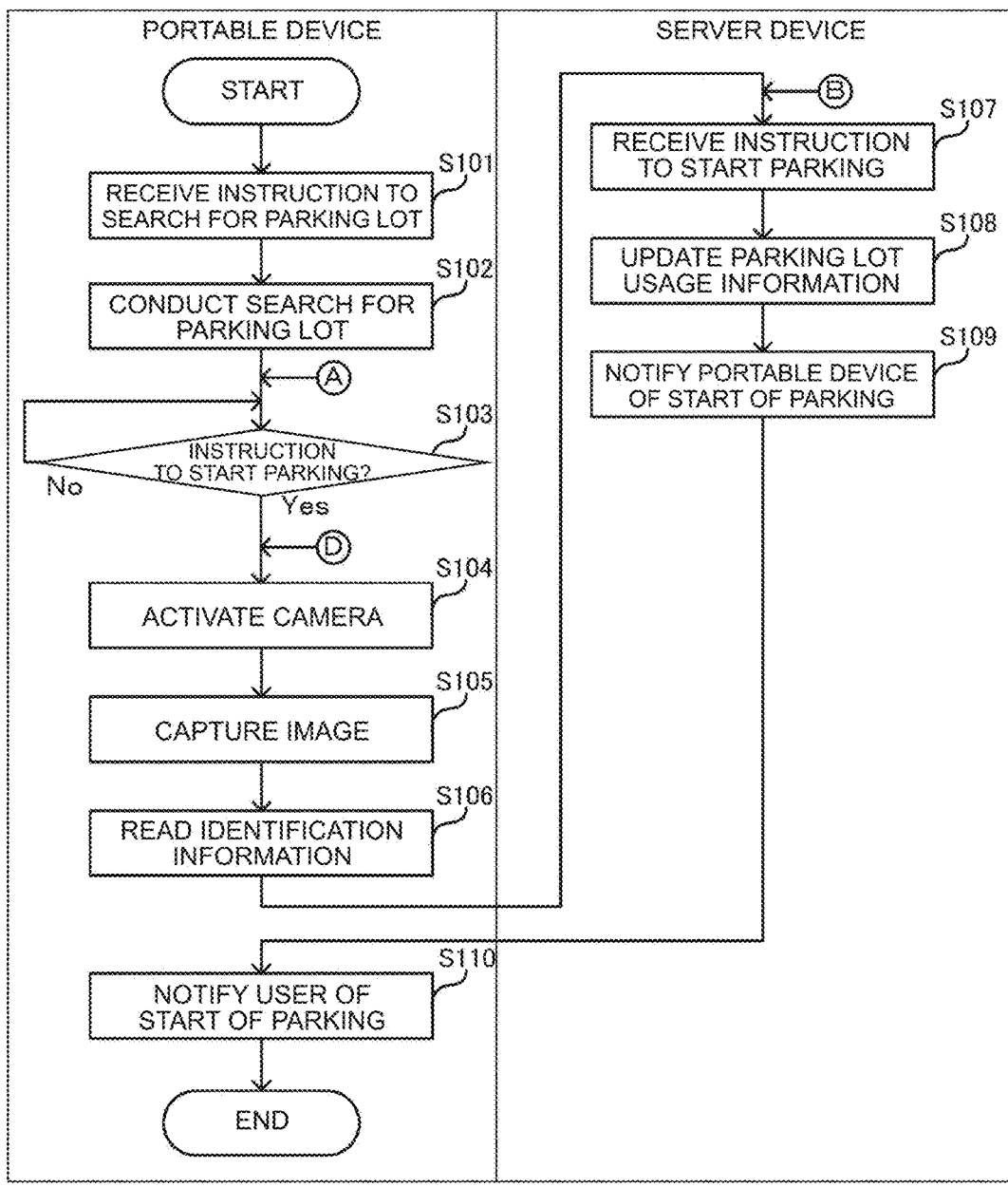
FIG. 5 is a flowchart showing an example of processing performed in a parking management system according to an embodiment.
Figure 6:
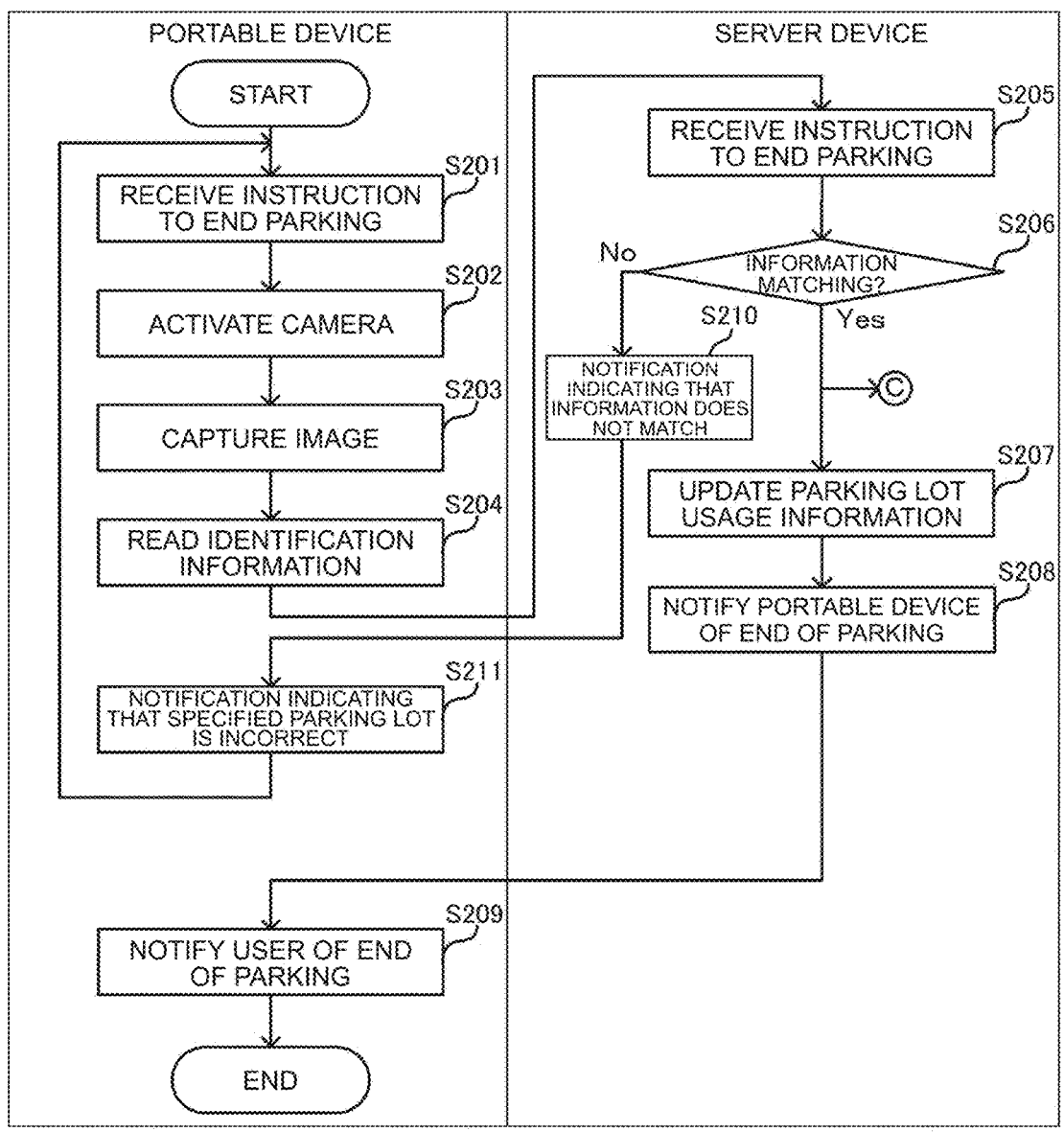
FIG. 6 is a flowchart showing an example of processing performed in a parking management system according to an embodiment.

An example of the processing according to this Example to determine the start and end of the parking of the vehicle 30 in a parking lot will now be described, referring to the flowchart shown in FIGS. 5 and 6. In FIGS. 5 and 6, the process steps shown in the area indicated as "Portable Device" are steps performed by the portable device 20, while the process steps shown in the area indicated as "Server Device" are steps performed by the server device 10. This will also apply to the other flowcharts.

An example of the processing to determine the start of the parking of the vehicle 30 at a parking lot will now be described, referring firstly to FIG. 5.

When the portable device 20 receives a user's instruction to search for a parking lot (step S101), the portable device 20 executes the processing to search for a parking lot with an available space, and displays the results of the search on the display unit 25 (step S103). This searching processing can be performed by way of the communication of the portable device 20 with the server device 10 so as to search the database 110 in the server device 10. In response to receiving the result of the search, the user determines a particular parking space to park the vehicle 30.

When the portable device 20 subsequently receives the user's determination of a parking position as well as the user's instruction to start parking (YES in step S103), the portable device 20 activates the camera 26 (step S104). Based on the user's instruction, the portable device 20 takes an image of the 2D barcode provided in the parking space where the vehicle 30 is parked (step S105). For example, when the user has parked the vehicle 30 in the parking space 41 in the parking lot 40 (i.e., the vehicle 30 has entered the parking space 41), the user operates the portable device 20 and directs it to take an image of the 2D barcode 41a provided in the parking space 41. From the image of the 2D barcode obtained in step S105, the portable device 20 reads the identification information of the parking space (i.e., the parking position information) (step S106).

After that, the portable device 20 transmits, to the server device 10, an instruction to start parking, together with the identification information of the parking space, the date and time when such identification information was read, and the user information of the portable device 20. The server device 10 receives the instruction to start parking from the portable device 20 (step S107), and updates the parking lot usage information stored in the database 110 in accordance with the information received together with the instruction (step S108). Specifically, the parking lot usage information is updated in a manner such that: the identification information of the parking space is regarded as indicating the parking position; the date and time when the identification information was read is regarded as indicating the start date and time of parking; and the user information of the portable device 20 is regarded as indicating the information on the user who parked.

The server device 10 then notifies the portable device 20 of the start of the parking (step S109). The portable device 20 in turn notifies the user of such notification from the server device by, for example, displaying the notification on the display unit 25 (step S110), and after that, the processing in FIG. 5 ends.

As described above, based on the processing shown in FIG. 5, the parking management system 1 can identify the information concerning the position of the parking lot (or the parking space) where the vehicle 30 is parked and the date and time when such parking starts, without the need to equip the parking lot with cameras or other expensive devices for recognizing parked vehicles, and can perform parking management with the use of the above information. In other words, the present embodiment can manage the parking of vehicles at a lower cost.

Next, an example of the processing to determine the end of the parking of the vehicle 30 at a parking lot will be described, referring to the flowchart in FIG. 6.

The portable device 20 receives the user's instruction to end parking (step S201), and activates the camera 26 (step S202). Based on the user's instruction, the portable device 20 takes an image of the 2D barcode provided in the parking space in which the vehicle 30 is parked (step S203). For example, when the user wishes to end the parking of the vehicle 30 in the parking space 41 in the parking lot 40 (i.e., when the user wishes to enable the vehicle that has entered the parking space 41 to exit such parking space 41), the user operates the portable device 20 and instructs it to take an image of the 2D barcode 41a provided in the parking space 41. From the obtained image of the 2D barcode in step S203, the portable device 20 reads the identification information of the parking space (i.e., the parking position information) (step S204).

After that, the portable device 20 transmits, to the server device 10, an instruction to end parking, together with the identification information of the parking space, the date and time when such identification information was read, and the user information of the portable device 20. The server device 10 receives such instruction to end parking from the portable device 20 (step S205). The server device 10 then determines whether the user information, which is received in step S205 together with the identification information of the parking space, matches the user information stored in the database 110 as the parking lot usage information in association with the identification information of such parking space (step S206). In other words, in step S206, the server device 10 determines whether the user information and the identification information of the parking space related to the received instruction to end parking are consistent with the parking lot usage information stored in the database 110.

If it is determined that the received information matches (is consistent with) the stored information in step S206 (YES in step S206), the server device 10 updates the stored parking lot usage information in the database 110 based on the information received in step S205 (step S207). Specifically, the parking lot usage information is updated in a manner such that: the identification information of the parking space is regarded as indicating the position where the parking ends; the date and time when the identification information was read is regarded as indicating the end date and time of the parking; and the user information of the portable device 20 is regarded as indicating the information on the user who ends the parking.

The server device 10 then notifies the portable device 20 of the end of the parking (step S208). The portable device 20 in turn notifies the user of such notification from the server device by, for example, displaying the notification on the display unit 25 (step S209), and after that, the processing in FIG. 6 ends.

If it is determined that the received information does not match (is not consistent with) the stored information in step S206 (NO in step S206), the server device 10 notifies the portable device 20 of the same (step S210). The portable device 20 in turn notifies the user of such notification from the server device by, for example, displaying the notification on the display unit 25 (step S211), and the processing goes back to step S201.

As described above, based on the processing shown in FIG. 6, the parking management system 1 can identify the information concerning the position of the parking lot (or the parking space) where the vehicle 30 is parked and the date and time when such parking ends, without the need to equip the parking lot with cameras or other expensive devices for recognizing parked vehicles, and accordingly, parking management can be achieved at a lower cost using the above information.

Implementation Example 1.2

In some cases, the start date and time or the end date and time of parking identified by the processing shown in FIG. 5 or 6 may differ greatly from the date and time when the parking actually started or ended. For example, if there is a large difference between the actual date and time when the user parked the vehicle and the date and time when the user took an image of the 2D barcode in step S105 in FIG. 5, then, a large difference is generated for the start date and time of parking. If there is a large difference between the actual date and time when the user ended the parking of the vehicle and the date and time when the user took an image of the 2D barcode in step S203 in FIG. 6, then, a large difference is generated for the end date and time of parking. As a consequence, if, for example, the parking fee is calculated based on the parking duration which is determined from such start/end date and time of parking, a parking fee that does not reflect the actual parking duration may be calculated.

In light of the above, an example of the processing to perform parking management by identifying the date and time when the parking of the vehicle at the parking lot starts and ends in a more accurate manner will be described below.

Figure 7:
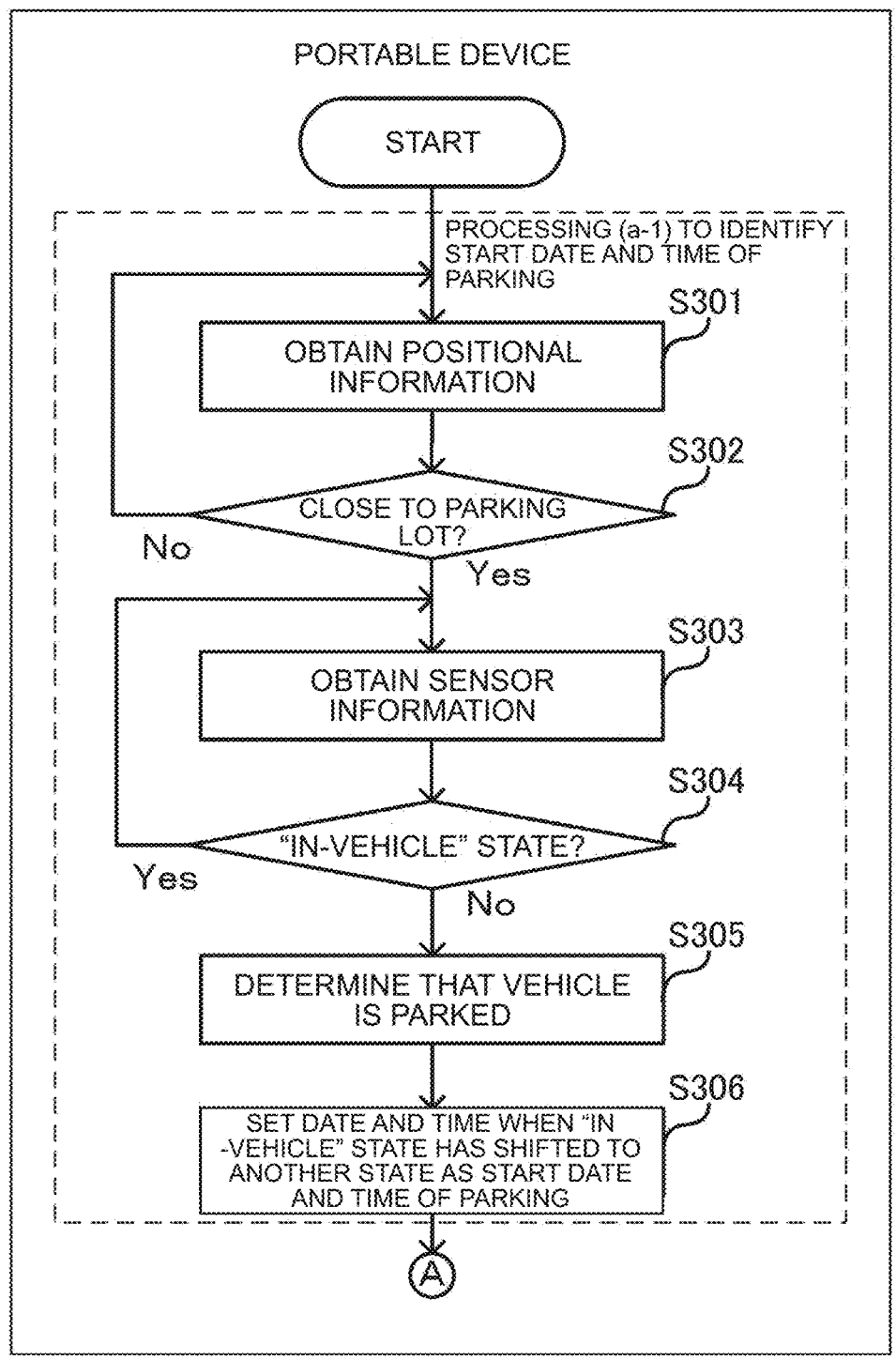
FIG. 7 is a flowchart showing an example of processing performed in a parking management system according to an embodiment.

An example of the processing to identify the start date and time of parking more accurately (processing (a-1)) will now be described, referring to the flowchart in FIG. 7. In processing (a-1), the portable device 20 held by the user who is in the vehicle 30 obtains its own positional information by means of positioning processing (step S301) and determines whether the current position is located close (e.g., within 30 m) to any parking lot having an available space (step S302). Information concerning parking lots having available spaces is obtained from the database 110 of the server device 10 via the network N.

If the current position is determined as being close to an available parking lot (YES in step S302), the portable device 20 obtains information sensed by the sensor 27 (i.e., the sensor information) (step S303), and determines whether the moving state of the user, which is identified based on such sensor information, is "in-vehicle" (which means that the user is moving with the vehicle) (step S304).

If the user is determined as being in a moving state other than "in-vehicle" (i.e., if the user, who was in the "in-vehicle" state at the time of steps S301 and S302, has shifted to another state) (NO in step S304), the portable device 20 determines that the vehicle 30 is parked (step S305). After that, the portable device 20 sets the date and time when it is determined in step S304 that the "in-vehicle" state has shifted to another state as the start date and time of parking (step S306).

In this manner, processing (a-1) ends, and after that, the processing moves to step S103 in FIG. 5. The start date and time of parking that has been set based on the processing in FIG. 7 will be used as the start date and time of parking in the processing in FIG. 5.

As described above, based on the processing shown in FIG. 7, if the current position is close to a parking lot having an available space and if the user's moving state is determined as having shifted from "in-vehicle" to another state based on the sensor information from the sensor 27, the portable device 20 sets the date and time when such determination has been made as the start date and time of parking. As a result, the start date and time of parking can be identified more accurately.

An example of the processing for identifying the end date and time of parking more accurately will now be described, referring to the flowchart shown in FIG. 8. The processing in FIG. 8 starts when the result of step S206 in the processing shown in FIG. 6 is YES.

Figure 8:
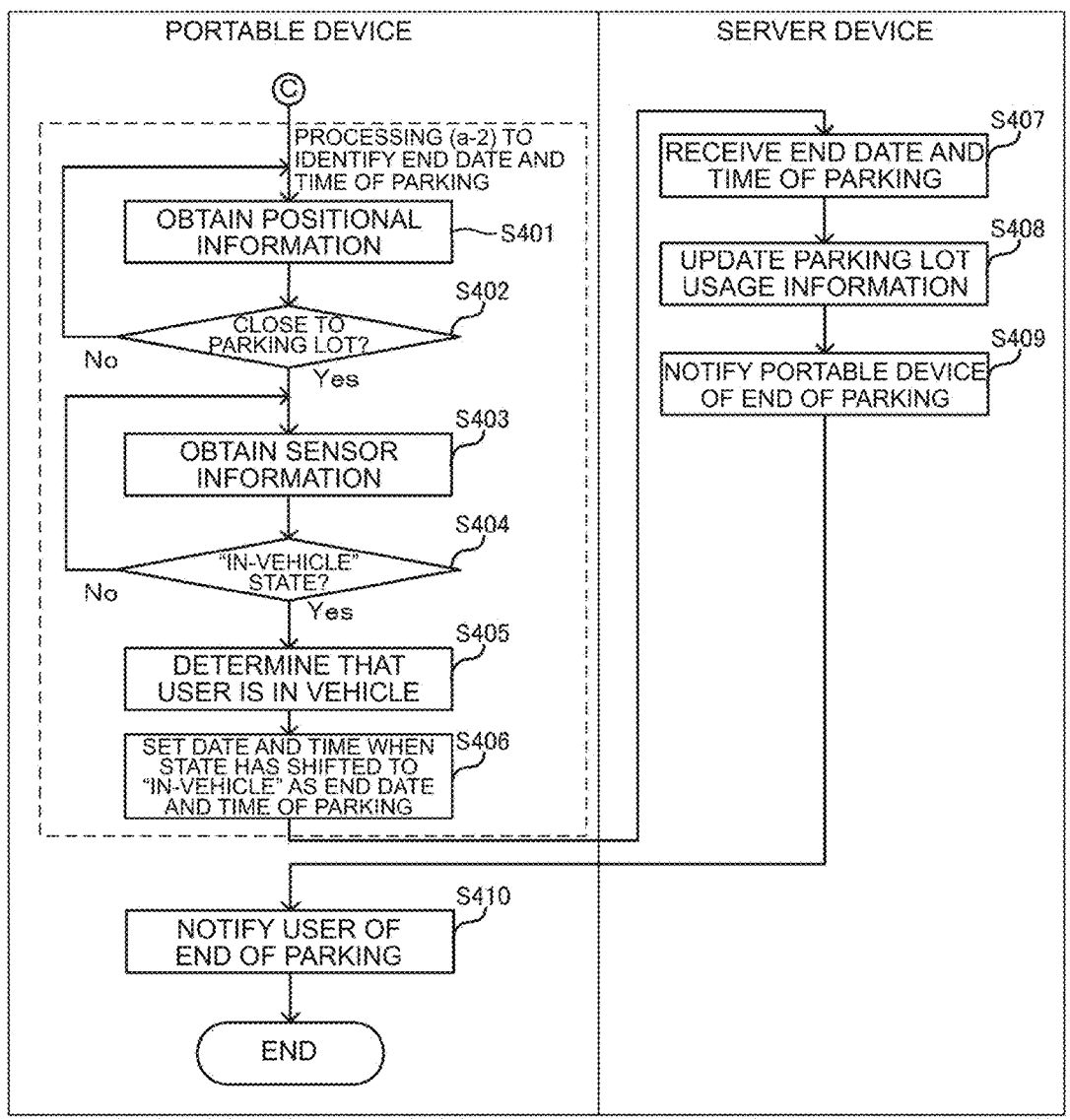
FIG. 8 is a flowchart showing an example of processing performed in a parking management system according to an embodiment.

First, the processing to identify the end date and time of parking (processing (a-2)), which corresponds to steps S401 to S406 in FIG. 8, is performed. In processing (a-2), the portable device 20 held by the user who is approaching the vehicle 30 which is parked in the parking lot by foot obtains its own positional information by means of positioning processing (step S401), and determines whether the current position is located close (e.g., within 10 m) to the parking lot where the vehicle 30 is parked (step S402). Information concerning the parking lot where the vehicle 30 is parked is obtained from the database 110 of the server device 10 via the network N.

If the current position is determined as being close to the parking lot of the vehicle 30 (YES in step S402), the portable device 20 obtains information sensed by the sensor 27 (step S403), and determines whether the moving state of the user, which is identified based on such sensor information, is "in-vehicle" (step S404).

If the moving state of the user is determined as being "in-vehicle" (i.e., if the user, who was in a moving state other than "in-vehicle," such as "walking," at the time of steps S401 and S402, has shifted to "in-vehicle") (YES in step S404), then, the portable device 20 determines that the user is now in the vehicle 30 (step S405). After that, the portable device 20 sets the date and time when it is determined in step S404 that the moving state has shifted to "in-vehicle" as the date and time when the user of the portable device 20 ends the parking of the vehicle 30 (step S406). Information on the end date and time of parking, which has been set in the manner described above, is transmitted to the server device 10.

When the server device 10 receives the information on the end date and time of parking from the portable device 20 (step S407), then, the server device 10 updates the parking lot usage information stored in the database 110 based on the information received in step S407 as well as the information received in step S205 in FIG. 6 (step S408). Specifically, the parking lot usage information is updated in a manner such that: the identification information of the parking space and the user information of the portable device 20, both received in step S205, are regarded as indicating the position where the parking ends and the information on the user who ends the parking, respectively; and the end date and time of parking received in step S407 are regarded as indicating the date and time when the parking ends.

The server device 10 then notifies the portable device 20 of the end of the parking (step S409). The portable device 20 in turn notifies the user of such notification from the server device by, for example, displaying the notification on the display unit 25 (step S410), and after that, the processing in FIG. 8 ends.

As described above, based on the processing shown in FIG. 8, if the current position is close to the parking lot where the vehicle is parked and if the moving state is determined, based on the sensor information from the sensor 27, as having shifted to "in-vehicle" from a state other than "in-vehicle," then the portable device 20 sets the date and time when such determination has been made as the end date and time of parking. As a result, the end date and time of parking can be identified more accurately.

Implementation Example 1.3

In the processing shown in FIGS. 5 and 6, in the cases where the system automatically reads the identification information of a parking space from an image of a 2D barcode, if the camera 26 is activated at an earlier timing than needed, the portable device 20 may conduct unnecessary operations or recognize the identification information incorrectly. An example of the processing to reduce such unnecessary operations by the portable device 20 and to also reduce incorrect recognition of the identification information will now be described, referring to FIGS. 9 and 10. It should be noted that, in this example, the portable device 20 is mounted and fixed on the instrument panel of the vehicle 30 and has cameras on both the front and back sides of the portable device 20. With this configuration, the portable device 20 is able to take images of the front and back sides of the vehicle 30 with the use of the cameras provided on both sides of the portable device 20.

The processing to start parking in a parking lot will now be described, referring first to FIG. 9. The portable device 20 performs processing (a-1) to identify the start date and time of parking (step S501). Such processing (a-1) is as described above with reference to FIG. 7, and this processing enables the start date and time of parking (i.e., the timing of starting parking) to be identified more accurately.

At a point in time after processing (a-1) is performed, the portable device 20 automatically activates the camera 26 (step S502), and takes an image within the range of the camera 26 (step S503). In other words, the camera 26 is activated after the timing of starting parking is identified more accurately in step S501, and accordingly, unnecessary operations performed by the camera 26 of the portable device 20 can be reduced.

After that, the portable device 20 determines whether the image taken in step S503 contains a 2D barcode and, if it does contain a 2D barcode, whether any identification information of a parking space can be read from the image of the 2D barcode (step S504). If any identification information can be read (YES in steps S504), the portable device 20 reads the identification information, and the processing moves to step S107 in FIG. 5. In other words, with steps S501 to S504, the portable device 20, after determining that parking starts, automatically reads the identification information of the parking space from the 2D barcode.

If no identification information can be read in step S504 (NO in step S504), the portable device 20 changes the imaging direction of the camera 26 (step S505), and then takes an image, thereby attempting to read the identification information of the parking space from the obtained 2D barcode image (step S506). Herein, such change of the imaging direction of the camera 26 means, for example, changing from imaging of the front side of the vehicle 30 using the camera provided on the front side of the portable device 20 to imaging of the back side of the vehicle 30 using the camera provided on the back side of the portable device 20. If any identification information can be read, the processing goes to step S107 in FIG. 5. If no identification information can be read, the portable device 20 presents a button to start parking on the display unit 25 so as to receive, through the button, an instruction to start parking from the user (step S508). After receiving an instruction to start parking, the processing goes to step S103 in FIG. 5. In other words, if it is determined in step S507 that the identification information of the parking space cannot be read automatically, the processing in FIG. 5 is performed.

As described above, based on the processing in FIG. 9, since the camera 26 is activated after the timing of starting parking has been identified more accurately, unnecessary operations by the camera 26 of the portable device 20 can be reduced. Furthermore, incorrect recognition of the identification information due to an image taken at an inappropriate timing can also be reduced.

An example of the processing to reduce, upon ending the parking, unnecessary operations performed by the portable device 20 as well as incorrect recognition of the identification information will now be described, referring to FIG. 10.

The portable device 20 performs processing (a-2) to identify the end date and time of parking (step S601). Such processing (a-2) is as described above with reference to FIG. 8, and it enables the end date and time of parking to be identified more accurately without using images taken by the camera 26.

The server device 10 then receives, from the portable device 20, an instruction to end parking, together with the information on the date and time when the parking of the vehicle 30 ends (step S602), and updates, based on the received information, the parking lot usage information stored in the database 110 so as to reflect the information concerning the end of the parking (step S603).

The server device 10 then transmits a notification indicating the end of the parking to the portable device 20 (step S604). The portable device 20 in turn presents such notification from the server device 10 to the user by, for example, displaying the notification on the display unit 25 (step S605), and the processing shown in FIG. 10 ends.

As described above, based on the processing in FIG. 10, since the date and time when the parking of the vehicle 30 ends is identified without using images taken by the camera 26, unnecessary operations performed by the camera 26 of the portable device 20 can be reduced, and the occurrence of incorrect recognition of the identification information can also be reduced.

Implementation Example 1.4

In the cases where the identification information of the parking space is read from an image taken by the camera 26, there may be cases in which the identification information cannot be read because the user does not operate the camera 26 to take an image of the 2D barcode or because the camera 26 is unable to take an image of the 2D barcode in an automatic manner. The processing to reduce the occurrence of such event will now be described, with reference to FIGS. 11 and 12.

The processing performed upon starting parking will now be described, referring to FIG. 11. The portable device 20 first performs processing (a-1) to identify the start date and time of parking (step S701). Such processing (a-1) is as described above with reference to FIG. 7. After that, the portable device 20 determines whether a predetermined time (e.g., three minutes) has passed (step S702). If the predetermined time has passed, the portable device 20 determines whether an instruction to start parking has been received from the user (step S703). If such instruction has been received, the processing goes to step S104 in FIG. 5. If no such instruction has been received, the portable device 20 notifies the user so as to prompt the user to provide an instruction to start parking (step S704), and the processing goes back to step S702. A notification to prompt the provision of an instruction may be made, for example, by displaying a message on the display unit 25 of the portable device 20, or by generating sounds from the portable device 20.

As described above, based on the processing shown in FIG. 11, the portable device 20 provides a notification to prompt the user to send an instruction to start parking if no such instruction is given within a predetermined period after the identification of the start date and time of the parking. As a result, the occurrence of an event in which no identification information of the parking space is read despite the parking of the vehicle 30 having started can be reduced.

The processing performed upon ending the parking will now be described, referring to FIG. 12. The portable device 20 first performs processing (a-2) to identify the end date and time of parking (step S801). Such processing (a-2) is as described above with reference to FIG. 8. After that, the portable device 20 determines whether a predetermined time (e.g., three minutes) has passed (step S802). If the predetermined time has passed, the portable device 20 determines whether an instruction to end parking has been received from the user (step S803). If such instruction has been received, the processing goes to step S602 in FIG. 10. If no such instruction has been received, the portable device 20 notifies the user so as to prompt the user to provide an instruction to end parking (step S804), and then the processing goes back to step S802. A notification to prompt the provision of an instruction may be made, for example, by displaying a message on the display unit 25 of the portable device 20, or by generating sounds from the portable device 20.

As described above, based on the processing shown in FIG. 12, the portable device 20 provides a notification to prompt the user to send an instruction to end parking if no such instruction is given within a predetermined period after the identification of the end date and time of parking. As a result, the occurrence of an event in which no identification information of the parking space is read despite the parking of the vehicle 30 having ended can be reduced.

3.2 Implementation Example 2

Implementation Example 2 is an example in which parking management is carried out by way of processing performed by the server device 10, the portable device 20 and the vehicle 30, from among the components of the parking management system 1 shown in FIG. 1.

Implementation Example 2.1

An example of the processing to determine the start and end of the parking of the vehicle 30 at a parking lot will now be described, referring to the flowchart shown in FIGS. 13 and 14.

First, as an example of the processing to determine the start of the parking of the vehicle 30 at a parking lot, processing (b-1) to identify the start date and time of parking will be described with reference to FIG. 13.

The portable device 20 first receives data from an in-vehicle terminal of the vehicle 30, such data including the positional information of the vehicle 30 and signals related to the vehicle (vehicle signals) (step S901). The in-vehicle terminal is a component mounted in the vehicle 30 and it has, for example, the same features as those of the portable device 20 described above, as well as other different features. The positional information of the vehicle 30 is identified by the positioning means provided in the vehicle 30. The vehicle signals include, for example, an accessory (ACC) signal. The vehicle signals may also include an automatic transmission (AT) shift signal, an ignition (IG) signal, and/or a vehicle speed signal.

Next, the portable device 20 reads the positional information of the vehicle 30 from the data received in step S901 (step S902), and determines whether the current position of the vehicle 30 is close (e.g., within 10 m) to any parking lot having an available space (step S903). Information concerning parking lots having available spaces is obtained from the database 110 of the server device 10 via the network N.

If the current position is determined as being close to an available parking lot (YES in step S903), the portable device 20 reads the vehicle signals from the data received in step S901 (step S904), and determines whether the AT shift signal indicates "P" (parking) (step S905). If the AT shift signal indicates parking (YES in step S905), the portable device 20 determines that the vehicle 30 is currently parked in a parking lot (step S906).

It should be noted here that when the vehicle signals read in step S904 include an AT shift signal, an IG signal or a vehicle speed signal, a determination may be made in step S905, based on each of such signals, as to whether the AT shift signal indicates "P" (parking), whether the IG signal indicates "OFF," or whether the vehicle speed signal indicates zero, and the vehicle 30 may be determined in step S906 as being parked in a parking lot if the result of the above determination is YES.

After that, the portable device 20 sets the date and time when a result of YES is given in the determination in step S905 as the date and time when the parking in the parking lot starts (step S907).

In this manner, processing (b-1) ends, and after that, the processing moves to step S103 in FIG. 5.

As described above, based on the processing shown in FIG. 13, the parking management system 1 can identify the information concerning the position of the parking lot (or the parking space) where the vehicle 30 is parked and the date and time when such parking starts, without the need to equip the parking lot with cameras or other expensive devices for recognizing parked vehicles, and accordingly, with the use of such information, the parking management system 1 can achieve parking management at a lower cost.

Figure 13:
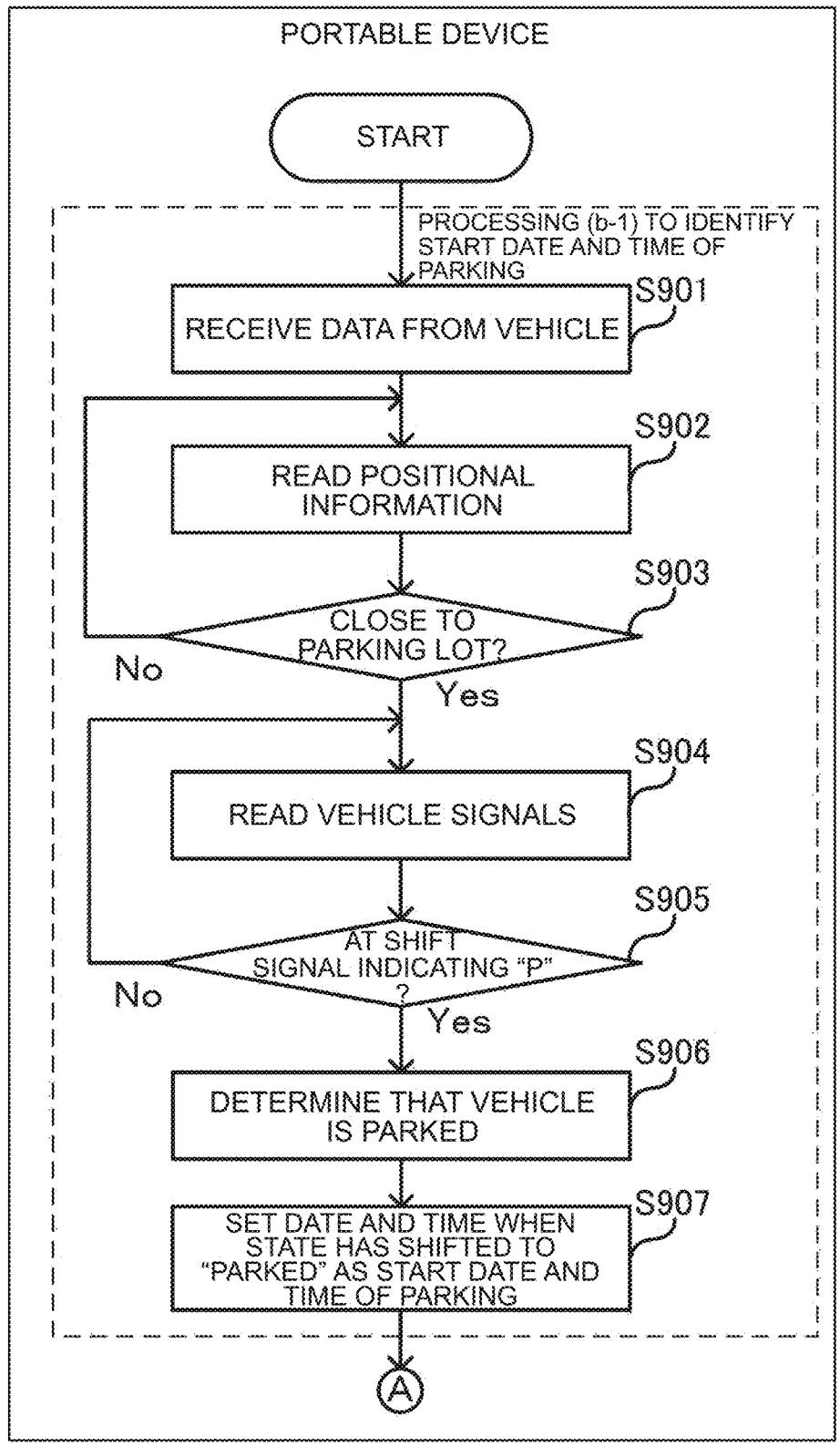
FIG. 13 is a flowchart showing an example of processing performed in a parking management system according to an embodiment.

Moreover, based on the processing shown in FIG. 13, the timing of starting parking in a parking lot is identified using the vehicle signals sent from the vehicle 30. Since the vehicle signals, e.g., an ACC signal, an AT shift signal, an IG signal and a vehicle speed signal, are automatically sent from the vehicle based on the state of the vehicle, the processing in FIG. 13, which uses such signals, enables the start date and time of parking to be identified more accurately than in the case where the user manually specifies the time when the user starts parking.

An example of the processing to determine the end of the parking of the vehicle 30 at a parking lot will now be described, referring to the flowchart in FIG. 14. The processing in FIG. 14 starts when the result of the determination in step S206 in the processing shown in FIG. 6 is YES.

The portable device 20 first performs processing (b-2) to identify the date and time when the parking ends (this processing corresponds to steps S1001 to S1007). In such processing (b-2), the portable device 20 first receives, from the in-vehicle terminal of the vehicle 30, data including the positional information of the vehicle 30 as well as signals related to the vehicle (vehicle signals) (step S1001). The positional information of the vehicle 30 is identified by the positioning means provided in the vehicle 30. The vehicle signals include, for example, a vehicle speed signal.

Next, the portable device 20 reads the positional information of the vehicle 30 from the data received in step S1001 (step S1002), and determines whether the current position of the vehicle 30 is close (e.g., within 10 m) to the parking lot where the vehicle 30 is parked (step S1003). Information on the parking lot where the vehicle 30 is parked is obtained from the database 110 of the server device 10 via the network N.

If the current position is determined as being close to the parking lot (YES in step S1003), the portable device 20 reads the vehicle signals from the data received in step S1001 (step S1004), and determines whether the vehicle speed has a value greater than zero (step S1005). If the vehicle speed is greater than zero (YES in step S1005), the portable device 20 determines that the vehicle 30 is moving (step S1006).

It should be noted here that a given method may be employed as appropriate to determine whether the vehicle 30 is moving, instead of the above-described method utilizing the vehicle speed. For example, the vehicle 30 may be determined as moving if the data received from the vehicle 30 indicates that an amount of change in the position of the vehicle 30 during a predetermined period is equal to or greater than a predetermined value.

After that, the portable device 20 sets the date and time when the vehicle 30 is determined as moving in step S1106 as the date and time when the parking ends (step S1007).

In this manner, processing (b-2) ends, and after that, the server device 10 receives, from the portable device 20, an instruction to end the parking of the vehicle 30, together with the end date and time of parking, the identification information of the parking space, and the information on the user (step S1008). Based on the information received in step S1008 and the information received in step S205 in FIG. 6, the server device 10 updates the parking lot usage information stored in the database 110 so as to reflect the information concerning the end of the parking of the vehicle 30 (step S1009).

The server device 10 then transmits a notification indicating the end of the parking to the portable device 20 (step S1010). The portable device 20 in turn presents such notification from the server device 10 to the user, for example, by displaying the notification on the display unit 25 (step S1011), and the processing shown in FIG. 14 ends.

As described above, based on the processing shown in FIG. 14, the parking management system 1 can identify the information concerning the position of the parking lot (or the parking space) where the vehicle 30 is parked and the date and time when such parking ends, without the need to equip the parking lot with cameras or other expensive devices for recognizing parked vehicles, and accordingly, with the use of such information, the parking management system 1 can achieve parking management at a lower cost.

Figure 14:
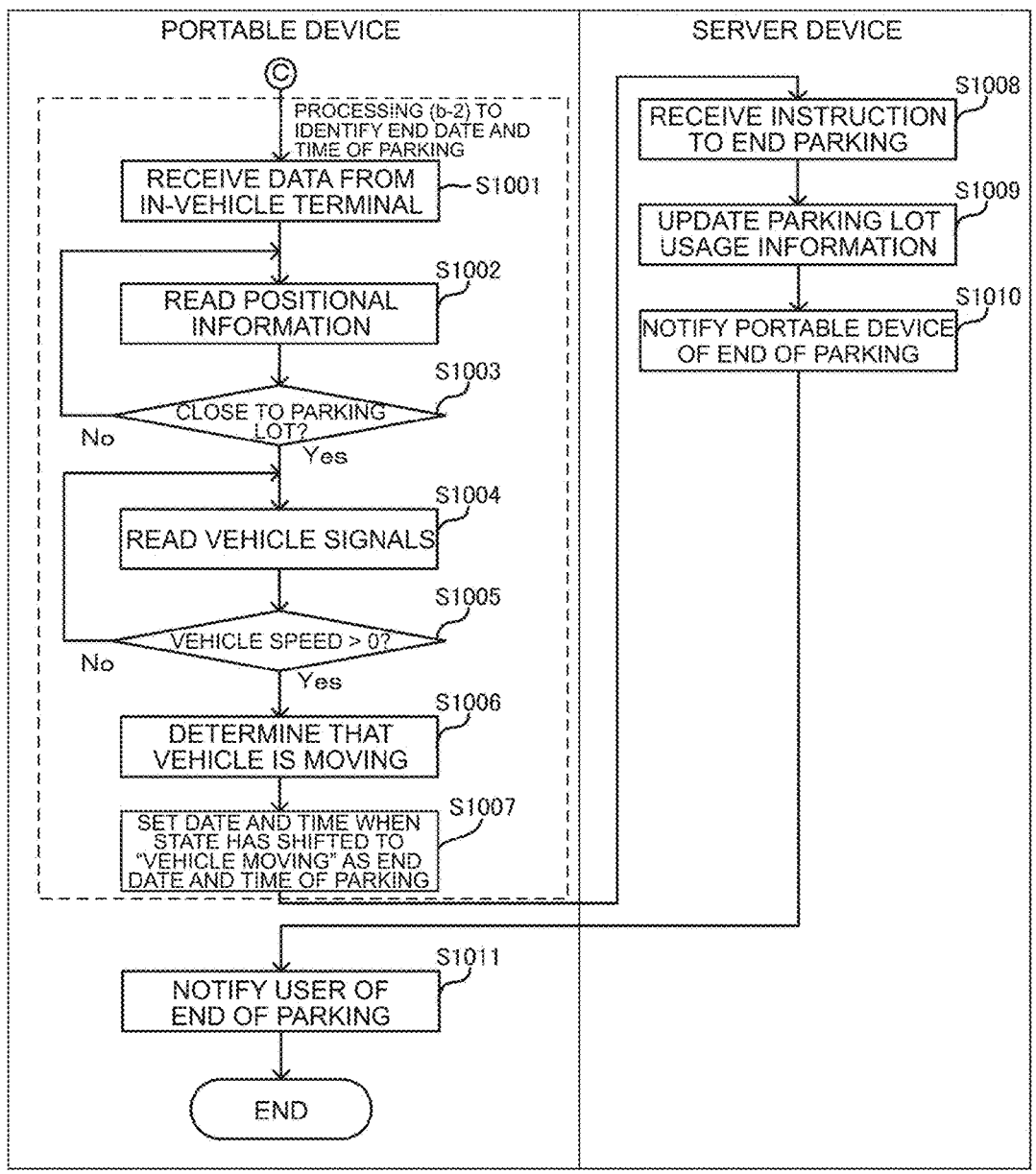
FIG. 14 is a flowchart showing an example of processing performed in a parking management system according to an embodiment.

Moreover, based on the processing shown in FIG. 14, the timing of ending parking in a parking lot is identified using the vehicle signals and/or positional information sent from the vehicle 30. Since the content of such vehicle signals and positional information changes automatically, based on the state of the vehicle, the processing in FIG. 14, which uses such signals and information, enables the end date and time of parking to be identified more accurately than in the case where the user manually specifies the time when the user ends parking.

Figure 15:
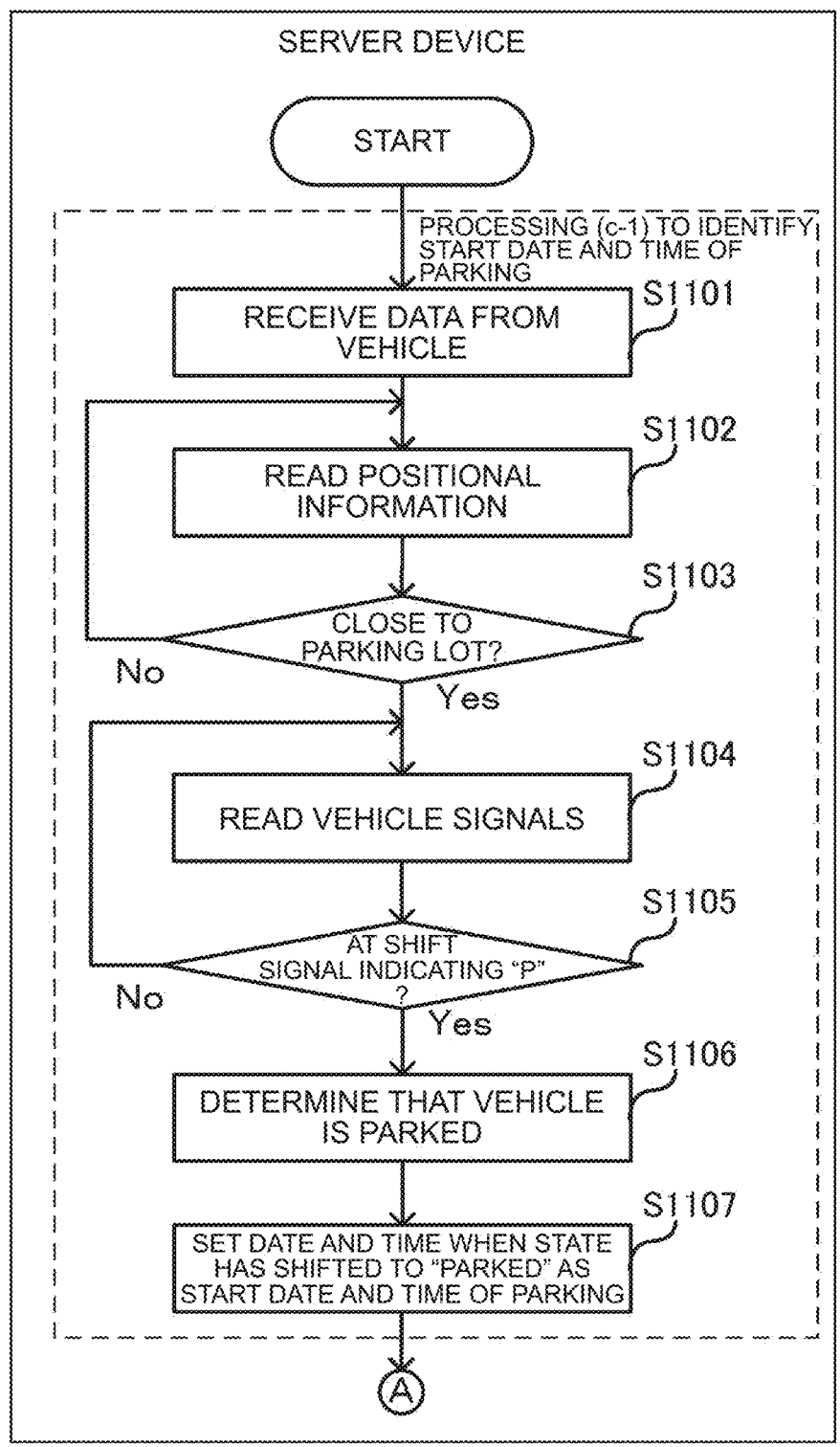
FIG. 15 is a flowchart showing an example of processing performed in a parking management system according to an embodiment.
Figure 16:
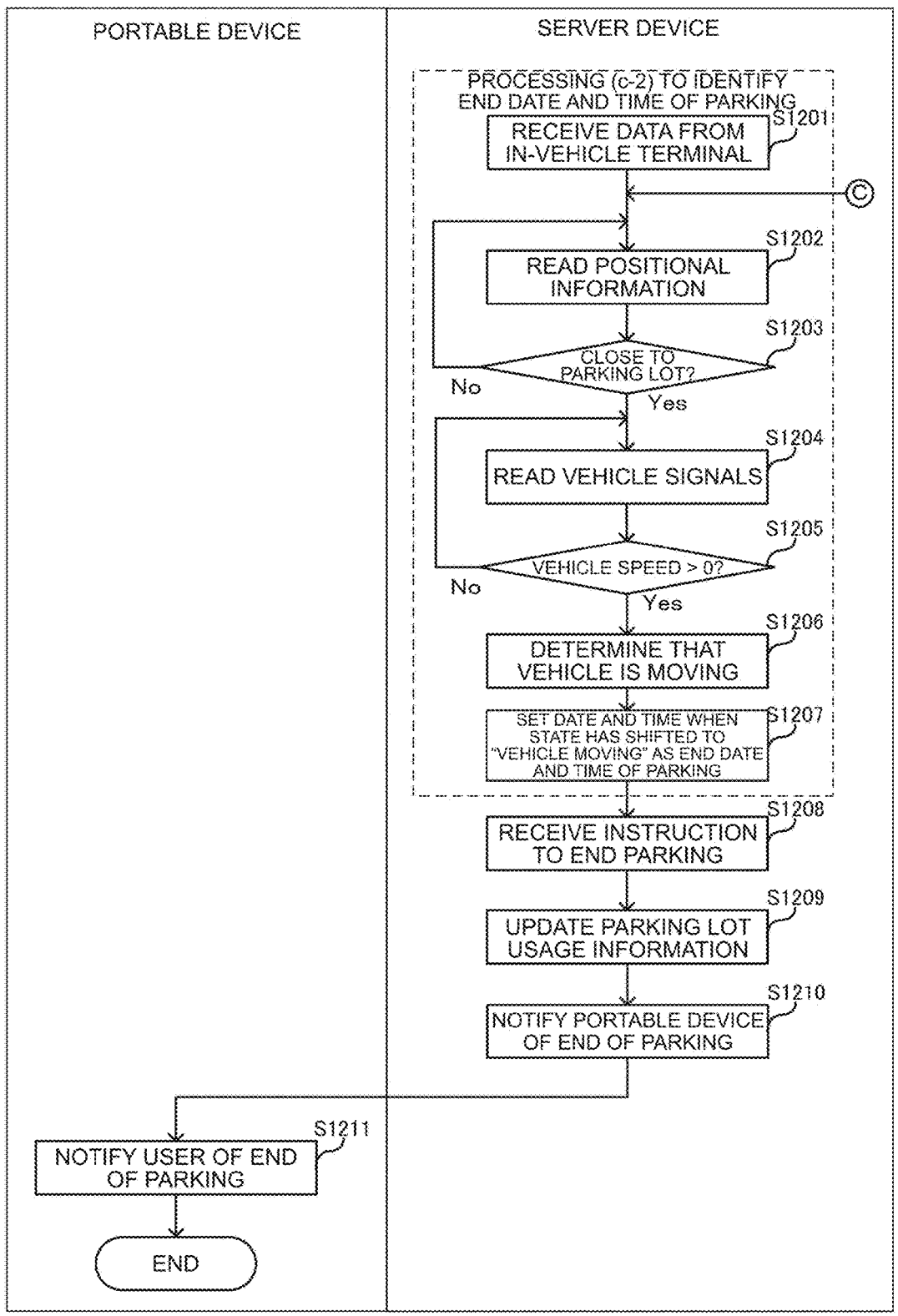
FIG. 16 is a flowchart showing an example of processing performed in a parking management system according to an embodiment.

In the processing shown in FIGS. 13 and 14, the portable device 20 performs the processing to identify the date and time when the parking starts and ends based on the data received from the vehicle 30. In a modification of such processing, the server device 10 may perform the processing to identify the date and time when the parking starts and ends based on the data received from the vehicle 30. FIGS. 15 and 16 each illustrate the processing based on such modification.

As an example of the processing which is performed by the server device 10 to determine the start of the parking of the vehicle 30 at a parking lot based on data received from the vehicle 30, processing (c-1) to identify the start date and time of parking is shown in FIG. 15. In processing (c-1), the operations in steps S1101 to S1107 are the same as those in steps S901 to S907 in FIG. 13, although they are performed by the portable device 20, and accordingly, the description of these steps will be omitted here.

As an example of the processing which is performed by the server device 10 to determine the end of the parking of the vehicle 30 at a parking lot based on data received from the vehicle 30, processing (c-2) to identify the end date and time of parking is shown in FIG. 16. In processing (c-2), the operations in steps S1201 to S1207 are the same as those in steps S1001 to S1007 in FIG. 14, although they are performed by the portable device 20, and accordingly, the description of these steps will be omitted here.

Implementation Example 2.2

In the processing according to Implementation Example 2.1 (see FIGS. 5, 6, 13 and 14), the camera 26 is activated in order to read the identification information of a parking space from an image of a 2D barcode; however, if such activation is made, for example, at an earlier timing than needed, the portable device 20 may conduct unnecessary operations or recognize the identification information incorrectly. An example of the processing to reduce such unnecessary operations performed by the portable device 20 and to also reduce incorrect recognition of the identification information will now be described.

Figure 9:
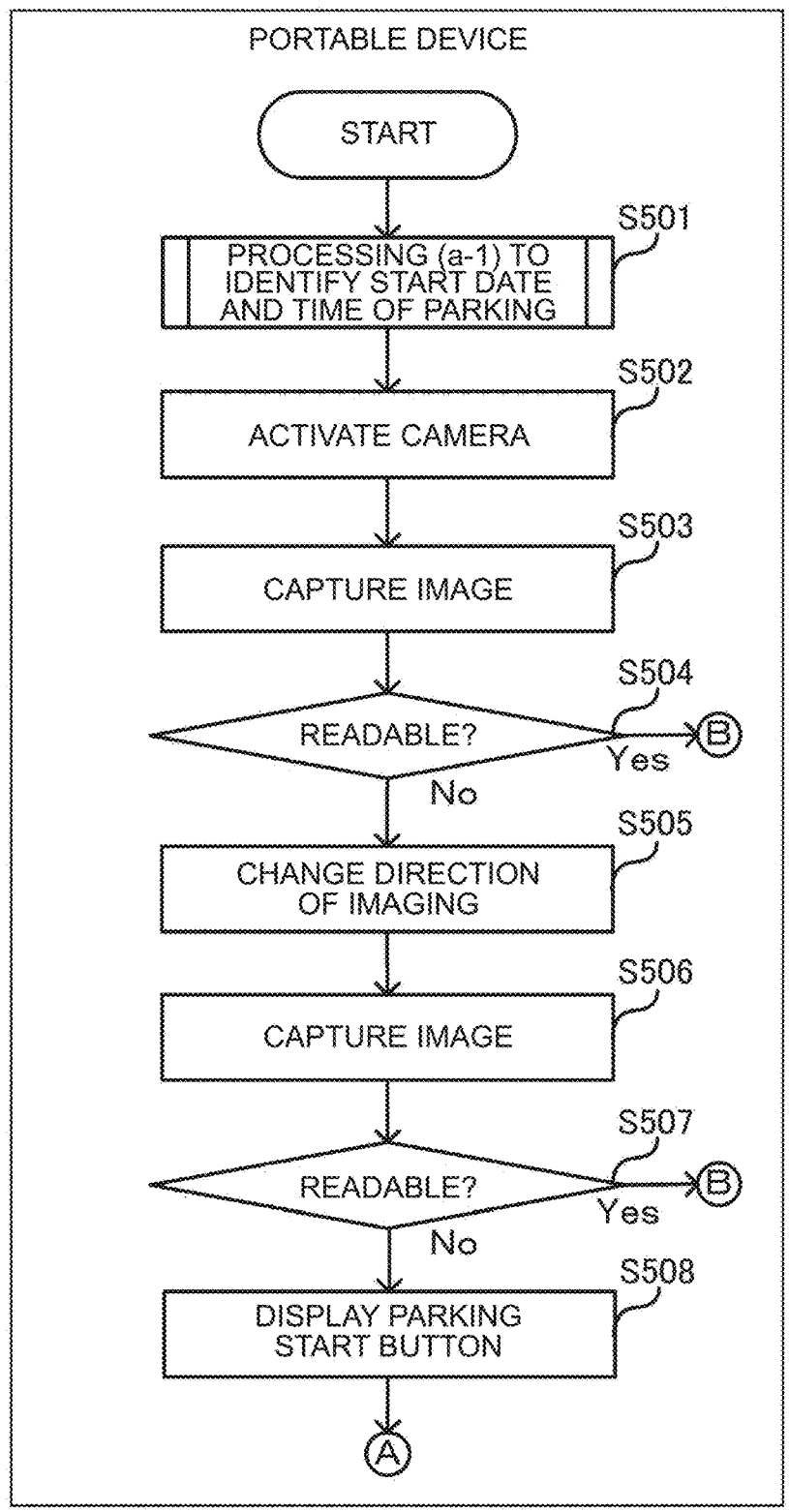
FIG. 9 is a flowchart showing an example of processing performed in a parking management system according to an embodiment.

In Implementation Example 2.2, the processing to start parking in a parking lot is implemented by the same processing as that shown in FIG. 9, except that processing (a-1) in step S501 is replaced with processing (b-1) in FIG. 13 or with processing (c-1) in FIG. 15. Since such processing in Implementation Example 2.2 is a combination of the already described kinds of processing, the description of the specific content thereof will be omitted here.

Figure 10:
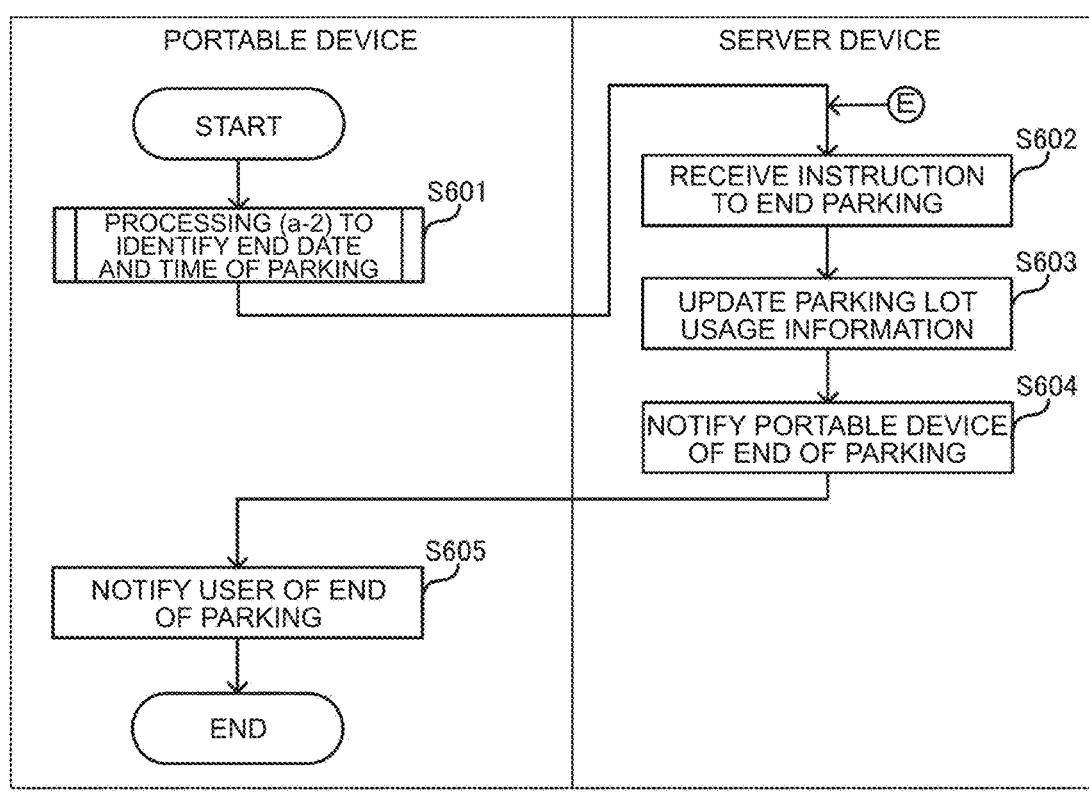
FIG. 10 is a flowchart showing an example of processing performed in a parking management system according to an embodiment.

In Implementation Example 2.2, the processing to end parking in a parking lot is implemented by the same processing as that shown in FIG. 10, except that processing (a-2) in step S601 is replaced with processing (b-2) in FIG. 14 or with processing (c-2) in FIG. 16. Since such processing in Implementation Example 2.2 is a combination of the already described kinds of processing, the description of the specific content thereof will be omitted here.

Based on the processing to start parking in Implementation Example 2.2, since the camera 26 is activated after the timing of starting parking has been identified more accurately, unnecessary operations by the camera 26 of the portable device 20 can be reduced. Furthermore, incorrect recognition of the identification information due to an image taken at an inappropriate timing can also be reduced. Based on the processing to end parking in Implementation Example 2.2, since the date and time when the parking of the vehicle 30 ends is identified without using images taken by the camera 26, unnecessary operations performed by the camera 26 of the portable device 20 can be reduced, and the occurrence of incorrect recognition of the identification information can also be reduced.

Implementation Example 2.3

In the processing according to Implementation Example 2.1, in the cases where the identification information of the parking space is read from images taken by the camera 26, there may be cases in which the identification information cannot be read because the user does not operate the camera 26 to take an image of the 2D barcode or because the camera 26 is unable to take an image of the 2D barcode in an automatic manner. An example of the processing to reduce the occurrence of such event will now be described.

Figure 11:
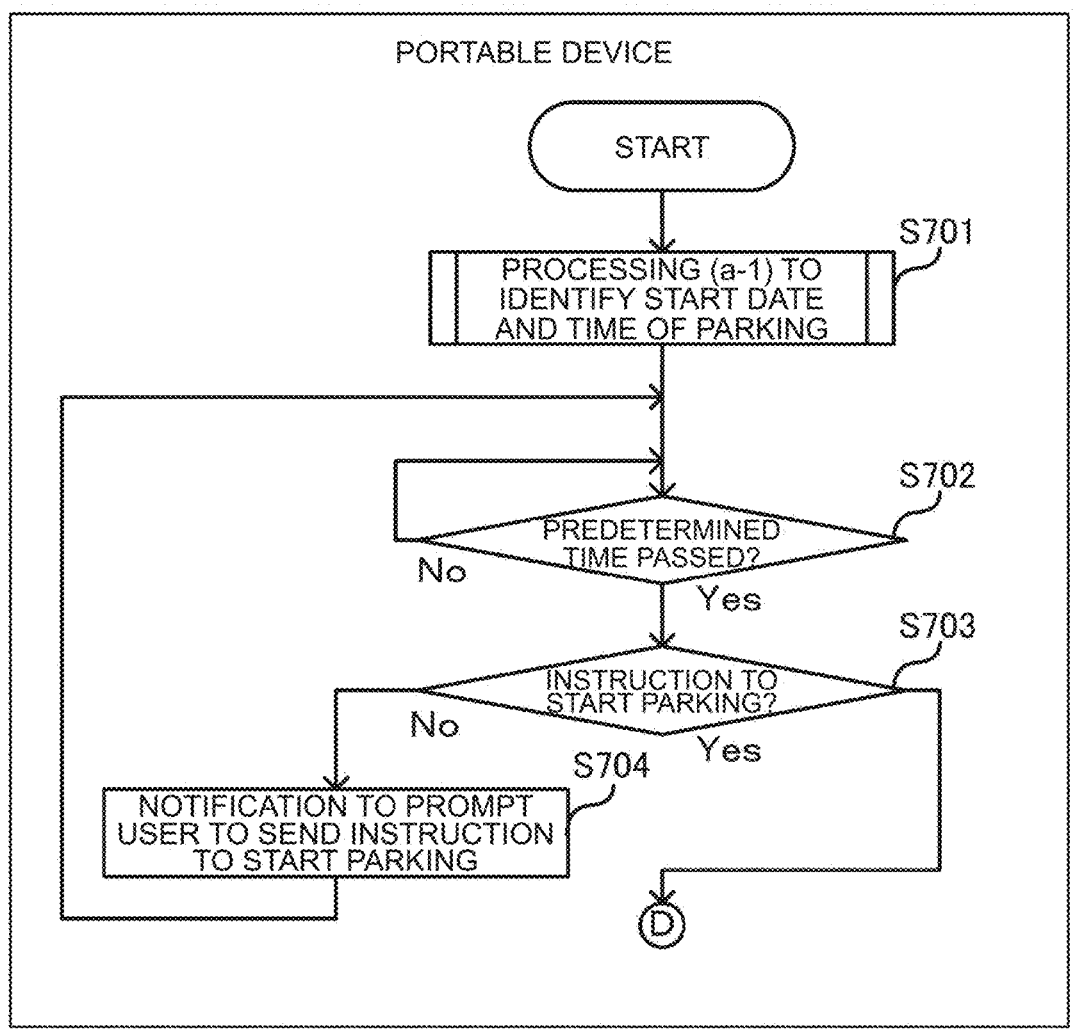
FIG. 11 is a flowchart showing an example of processing performed in a parking management system according to an embodiment.

In Implementation Example 2.3, the processing to start parking in a parking lot is implemented by the same processing as that shown in FIG. 11, except that processing (a-1) in step S701 is replaced with processing (b-1) in FIG. 13 or with processing (c-1) in FIG. 15. Since such processing in Implementation Example 2.3 is a combination of the already described kinds of processing, the description of the specific content thereof will be omitted here.

Figure 12:
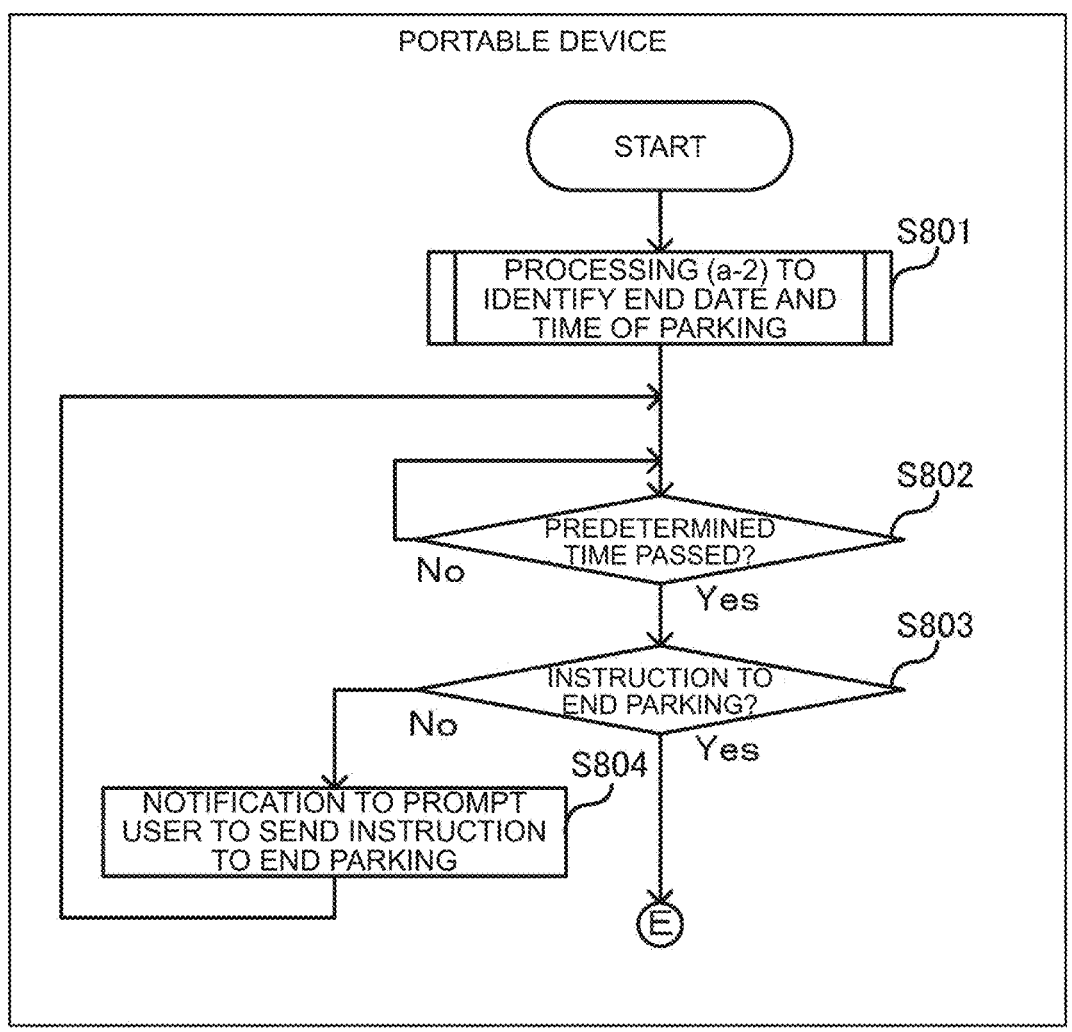
FIG. 12 is a flowchart showing an example of processing performed in a parking management system according to an embodiment.

In Implementation Example 2.3, the processing to end parking in a parking lot is implemented by the same processing as that shown in FIG. 12, except that processing (a-2) in step S801 is replaced with processing (b-2) in FIG. 14 or with processing (c-2) in FIG. 16. Since such processing in Implementation Example 2.3 is a combination of the already described kinds of processing, the description of the specific content thereof will be omitted here.

Based on the processing to start parking in Implementation Example 2.3, the portable device 20 provides a notification to prompt the user to send an instruction to start parking if no such instruction is given by the user within a predetermined period after the identification of the start date and time of parking. As a result, the occurrence of an event in which no identification information of the parking space is read despite the parking of the vehicle 30 having started can be reduced. Furthermore, based on the processing to end parking in Implementation Example 2.3, the portable device 20 provides a notification to prompt the user to send an instruction to end parking if no such instruction is given by the user within a predetermined period after the identification of the end date and time of parking. As a result, the occurrence of an event in which no identification information of the parking space is read despite the parking of the vehicle 30 having ended can be reduced.

3.3 Implementation Example 3

Implementation Example 3 is an example in which parking management is carried out by way of processing performed by the server device 10 and the vehicle 30, from among the components of the parking management system 1 shown in FIG. 1.

The processing in Implementation Example 3 is implemented by the same processing as that described in Implementation Example 1.3, except that each process performed by the portable device 20 in Implementation Example 1.3 is performed by the vehicle 30. In this example, the vehicle 30 includes the same configuration as that of the portable device 20.

Similarly to Implementation Example 1.3, based on the processing to start parking in Implementation Example 3, since a camera mounted in the vehicle 30 is automatically activated to take an image after the timing of starting parking has been identified more accurately, unnecessary operations by the camera can be reduced. Furthermore, incorrect recognition of the identification information due to an image taken at an inappropriate timing can also be reduced. Based on the processing to end parking in Implementation Example 3, since the date and time when the parking of the vehicle 30 ends is identified without using images taken by the camera of the vehicle 30, unnecessary operations performed by the camera can be reduced, and the occurrence of incorrect recognition of the identification information can also be reduced.

3.4 Other Examples

Embodiments of the present invention have been described above with reference to the attached drawings; however, the scope of the present invention is not limited to the described embodiments. A person skilled in the art could obviously think of various alterations and modifications without departing from the idea recited in the scope of the claims, and such alterations and modifications would obviously fall within the technical scope of the present invention.

In addition, the present invention may be implemented as a program with which the processing described in the above embodiments can be performed. Such a program according to the present invention can be stored in a variety of storage media, including optical disks, such as CD-ROM, magnetic disks and semiconductor memory. The program can be installed or loaded on a computer by downloading it through such storage media or via a communication network.

What is claimed is:

1. A parking management system comprising: a terminal device; and a server device, wherein the terminal device includes a storage unit that stores user information, a reading unit that reads identification information of a parking space from a code associated with the parking space, and a transmission unit that transmits, to the server device, parking position information which includes the stored user information and the read identification information, wherein the server device includes a receiving unit that receives the parking position information from the terminal device, and an identifying unit that identifies a position where a vehicle is parked and a user of the parked vehicle, based on the received parking position information
wherein:
the terminal device includes
a positioning unit,
a sensor unit that senses a state of the user, and
a determining unit that determines a start or end of parking of a vehicle based on a position of the terminal device identified by the positioning unit and a result of sensing by the sensor unit;
the transmission unit transmits parking start information or parking end information to the server device based on a result of the determination; and
in the server device, the receiving unit receives the parking start information or the parking end information, and the identifying unit identifies a parking duration of the vehicle based on the parking start information or the parking end information,
wherein the determining unit determines that the parking of the vehicle has started when the position of the terminal device identified by the positioning unit is located in a parking lot and when the sensing by the sensor unit indicates that the terminal device has shifted from an in-vehicle state to a state other than the in-vehicle state,
wherein the determining unit determines that the parking of the vehicle has ended when the position of the terminal device identified by the positioning unit is located in the parking lot and when the sensing by the sensor unit indicates that the terminal device has shifted to the in-vehicle state from a state other than the in-vehicle state, and
wherein the identifying unit identifies the parking duration of the vehicle based on the parking start information and the parking end information.

2. The parking management system according to claim 1, wherein the reading unit automatically reads the code after the determining unit determines that parking has started.

3. A parking management system comprising:
a terminal device; and
a server device, wherein the terminal device includes
a storage unit that stores user information,
a reading unit that reads identification information of a parking space from a code associated with the parking space, and
a transmission unit that transmits, to the server device, parking position information which includes the stored user information and the read identification information,
wherein the server device includes a receiving unit that receives the parking position information from the terminal device, and
an identifying unit that identifies a position where a vehicle is parked
and a user of the parked vehicle, based on the received parking position information
wherein:
the terminal device includes
a positioning unit,
a sensor unit, and
a determining unit that determines a start or end of parking of a vehicle based on a position of the terminal device identified by the positioning unit and a result of sensing by the sensor unit;
the transmission unit transmits parking start information or parking end information to the server device based on a result of the determination; and
in the server device, the receiving unit receives the parking start information or the parking end information, and the identifying unit identifies a parking duration of a vehicle based on the parking start information or the parking end information,
wherein the terminal device has a notifying unit that provides a notification to the user when the identification information is not read by the reading unit within a predetermined time after the determining unit determines that parking has started.

4. The parking management system according to claim 1, wherein the code is a two dimensional barcode.

5. A terminal device comprising:
a storage unit that stores user information;
a reading unit that reads identification information of a parking space from a code associated with the parking space;
a transmission unit that transmits parking position information to a server device, the parking position information including the stored user information and the read identification information;
a positioning unit,
a sensor unit that senses a state of the user, and
a determining unit that determines a start or end of parking of a vehicle based on a position of the terminal device identified by the positioning unit and a result of sensing by the sensor unit;
wherein the transmission unit transmits parking start information or parking end information to the server device based on a result of the determination,
wherein the determining unit determines that the parking of the vehicle has started when the position of the terminal device identified by the positioning unit is located in a parking lot and when the sensing by the sensor unit indicates that the terminal device has shifted from an in-vehicle state to a state other than the in-vehicle state,
wherein the determining unit determines that the parking of the vehicle has ended when the position of the terminal device identified by the positioning unit is located in the parking lot and when the sensing by the sensor unit indicates that the terminal device has shifted to the in-vehicle state from a state other than the in-vehicle state, and
wherein the parking duration of the vehicle is identified based on the parking start information and the parking end information.

6. A method implemented in a parking management system including a terminal device and a server device, the method comprising:
in the terminal device,
storing user information,
reading identification information of a parking space from a code associated with the parking space, and
transmitting, to the server device, parking position information which includes the stored user information and the read identification information; and
in the server device,
receiving the parking position information from the terminal device, and
identifying a position where a vehicle is parked and a user of the parked vehicle, based on the received parking position information;
in the terminal device,
determining a start or end of parking of a vehicle based on a position of the terminal device identified by a positioning unit and a result of sensing by a sensor unit; and
transmitting parking start information or parking end information to the server device based on a result of the determination;
in the server device,
receiving the parking start information or the parking end information; and
identifying a parking duration of a vehicle based on the parking start information or the parking end information,
in the terminal device,
providing a notification to the user when the identification information is not read,
wherein the determining unit determines that the parking of the vehicle has started when the position of the terminal device identified by the positioning unit is located in a parking lot and when the sensing by the sensor unit indicates that the terminal device has shifted from an in-vehicle state to a state other than the in-vehicle state,
wherein the determining unit determines that the parking of the vehicle has ended when the position of the terminal device identified by the positioning unit is located in the parking lot and when the sensing by the sensor unit indicates that the terminal device has shifted to the in-vehicle state from a state other than the in-vehicle state, and
wherein the parking duration of the vehicle is identified based on the parking start information and the parking end information.

7. A method implemented in a terminal device, comprising:
storing user information,
reading identification information of a parking space from a code associated with the parking space,
transmitting parking position information to a server device, the parking position information including the stored user information and the read identification information;
measuring a position of the terminal device by a positioning unit of the terminal device;

sensing a state of a user by a sensor unit of the terminal device;

determining a start or end of parking of a vehicle based on a position of the terminal device identified by the positioning unit and a result of sensing by the sensor unit; and transmitting parking start information or parking end information to the server device based on a result of the determination, wherein the determining whether the parking of the vehicle has started is determined when the position of the terminal device identified by the positioning unit is located in a parking lot and when the sensing by the sensor unit indicates that the terminal device has shifted from an in-vehicle state to a state other than the in-vehicle state, wherein the determining whether the parking of the vehicle has ended is determined when the position of the terminal device identified by the positioning unit is located in the parking lot and when the sensing by the sensor unit indicates that the terminal device has shifted to the in-vehicle state from a state other than the in-vehicle state, and wherein the parking duration of the vehicle is identified based on the parking start information and the parking end information.

8. A non-transitory storage medium storing a program thereon, the program causing a terminal device to:

store user information;

read identification information of a parking space from a code associated with the parking space;

transmit parking position information to a server device, the parking position information including the stored user information and the read identification information;

measuring a position of the terminal device by a positioning unit of the terminal device;

sensing a state of a user by a sensor unit of the terminal device;

determining a start or end of parking of a vehicle based on a position of the terminal device identified by the positioning unit and a result of sensing by the sensor unit; and transmitting parking start information or parking end information to the server device based on a result of the determination, wherein the determining whether the parking of the vehicle has started is determined when the position of the terminal device identified by the positioning unit is located in a parking lot and when the sensing by the sensor unit indicates that the terminal device has shifted from an in-vehicle state to a state other than the in-vehicle state, wherein the determining that the parking of the vehicle has ended is determined when the position of the terminal device identified by the positioning unit is located in the parking lot and when the sensing by the sensor unit indicates that the terminal device has shifted to the in-vehicle state from a state other than the in-vehicle state, and wherein the parking duration of the vehicle is identified based on the parking start information and the parking end information.

* * * * *